US012696069B2

(12) United States Patent
Zhang et al.

(10) Patent No.: US 12,696,069 B2
(45) **Date of Patent: *Jul. 28, 2026**

(54) INDIRECT SINGLE RADIO VOICE CALL CONTINUITY

(71) Applicant: Qualcomm Incorporated, San Diego, CA (US)

(72) Inventors: Juan Zhang, Beijing (CN); Xipeng Zhu, San Diego, CA (US); Haris Zisimopoulos, London (GB); Xiangkai Guan, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 271 days.

This patent is subject to a terminal disclaimer.

(21) Appl. No.: 18/593,520

(22) Filed: Mar. 1, 2024

(65) Prior Publication Data

US 2024/0205757 A1    Jun. 20, 2024

Related U.S. Application Data

(62) Division of application No. 16/759,776, filed as application No. PCT/CN2018/112094 on Oct. 26, 2018, now Pat. No. 11,963,045.

(30) Foreign Application Priority Data

Oct. 31, 2017    (WO) ................ PCT/CN2017/108536

(51) Int. Cl.
H04W 8/08        (2009.01)
H04W 36/00      (2009.01)
H04W 36/14      (2009.01)

(52) U.S. Cl.
CPC ....... *H04W 8/08* (2013.01); *H04W 36/00226* (2023.05); *H04W 36/1446* (2023.05)

(58) Field of Classification Search
CPC ..... H04W 8/02; H04W 8/08; H04W 36/0011; H04W 36/0016; H04W 36/0022;
(Continued)

(56) References Cited

U.S. PATENT DOCUMENTS

2008/0019339 A1*  1/2008  Raju ..................... H04W 48/18
                                                                  370/328
2010/0255846 A1   10/2010  Vikberg et al.
(Continued)

FOREIGN PATENT DOCUMENTS

CN        101374356 A      2/2009
CN        104378795 A      2/2015
(Continued)

OTHER PUBLICATIONS

"3rd Generation Partnership Project; Technical Specification Group Services and System Aspects; Single Radio Voice Call Continuity (SRVCC); Stage 2 (Release 15)", 3GPP Standard ; Technical Specification ; 3GPP TS 23.216, 3rd Generation Partnership Project, Mobile Competence Centre; 650, Route Des Lucioles; F-06921, Sophia-Antipolis Cedex; France, vol. SA WG2, No. V15.0.0, Sep. 18, 2017, pp. 1-69, XP051336963, abstract, sections 5.3.3.2.3, 5.3.3A.1.3 and 6.2.2.1.
(Continued)

*Primary Examiner* — Matthew W Genack
(74) *Attorney, Agent, or Firm* — QUALCOMM IP DEPT.; James Hunt Yancey, Jr.

(57) ABSTRACT

Methods, systems, and devices for wireless communications are described. An access and mobility management function (AMF) associated with a first radio access network (RAN) may identify a user equipment (UE) connected to a source base station of the first RAN. The AMF may receive a handover message including a voice call continuity handover trigger message indicating a handover of the UE to a
(Continued)

target base station associated with a second RAN. In some examples, the AMF may transmit a bypass handover message to a second network device based a on the received handover message. In some cases, the bypass handover message may include the voice call continuity handover trigger message. In some examples, the second network device is a mobility management entity (MME) associated with an Evolved Universal Terrestrial Radio Access Network (E-UTRAN).

30 Claims, 16 Drawing Sheets

(58) Field of Classification Search
CPC ......... H04W 36/0066; H04W 36/0083; H04W 36/14; H04W 36/16; H04W 36/34
See application file for complete search history.

(56) References Cited

U.S. PATENT DOCUMENTS

| | | | | |
|---|---|---|---|---|
| 2011/0280217 | A1 | 11/2011 | Drevon et al. | |
| 2012/0165019 | A1* | 6/2012 | Shintani .......... | H04W 36/00226 |
| | | | | 455/436 |
| 2013/0017801 | A1 | 1/2013 | Shaikh | |
| 2014/0204908 | A1 | 7/2014 | Keller et al. | |
| 2015/0072685 | A1 | 3/2015 | Chuang | |
| 2017/0222932 | A1 | 8/2017 | Negm | |
| 2018/0132141 | A1* | 5/2018 | Huang-Fu .......... | H04L 65/1016 |
| 2018/0376444 | A1* | 12/2018 | Kim ...................... | H04W 76/30 |
| 2021/0185567 | A1 | 6/2021 | Zhang et al. | |
| 2021/0195490 | A1 | 6/2021 | Rommer et al. | |

FOREIGN PATENT DOCUMENTS

| | | | | |
|---|---|---|---|---|
| CN | 106537954 | A | 3/2017 | |
| EP | 3148252 | A1 | 3/2017 | |
| WO | WO-2010022611 | A1 * | 3/2010 | ...... H04W 36/00226 |
| WO | 2017028164 | A1 | 2/2017 | |
| WO | 2019075598 | A1 | 4/2019 | |

OTHER PUBLICATIONS

China Unicom: "Enable CS Fallback from 5G to 3G", 3GPP Draft, 3GPP TSG-SA WG1 Meeting #79, S1-173103, Enable 5G CS Fallback CU, 3rd Generation Partnership Project (3GPP), Mobile Competence Centre; 650, Route Des Lucioles; F-06921, Sophia-Antipolis Cedex; France, vol. SA WG1, No. Guilin, China, Aug. 21, 2017-Aug. 25, 2017, Aug. 21, 2017 (Aug. 21, 2017), XP051324763, 2 pages, the whole document.

Ericsson: "Adaptation to TS 23.228 due to 5GS", 3GPP Draft, SA WG2 Meeting #122, S2-174357, Jun. 26-30, 2017, San Jose Del Cabo, Mexico, pp. 1-66.

Huawei, et al., "5G Voice Service Continuity", 3GPP Draft, 3GPP TSG-SA WG1 Meeting #79, S1-173090, 5G Voice Service Continuity, 3rd Generation Partnership Project (3GPP), Mobile Competence Centre; 650, Route Des Lucioles; F-06921, Sophia-Antipolis Cedex; France, vol. SA WG1, No. Guilin, China, Aug. 21, 2017-Aug. 25, 2017, Aug. 21, 2017 (Aug. 21, 2017), XP051324751, 2 pages, the whole document.

International Preliminary Report on Patentability—PCT/CN2017/108536, The International Bureau of WIPO—Geneva, Switzerland, May 14, 2020.

International Preliminary Report on Patentability—PCT/CN2018/112094, The International Bureau of WIPO—Geneva, Switzerland, May 14, 2020.

International Search Report and Written Opinion—PCT/CN2017/108536—ISA/EPO—Jul. 20, 2018.

International Search Report and Written Opinion—PCT/CN2018/112094—ISA/EPO—Jan. 16, 2019.

OPPO, et al., "Discussion for Returning Back to NR in Case of Handover for Voice", SA WG2 Meeting #122bis, S2-176976, 3rd Generation Partnership Project, Mobile Competence Center, 650, Route Des Lucioles, F-06921 Sophia-Antipolis, vol. SA WG2, No. Ljubljana, Slovenia, Oct. 23, 2017-Oct. 27, 2017, Oct. 22, 2017, XP051346932, pp. 1-3, Sections 1-2, The Whole Document.

Orange, "TR22.864-2G-3G CS Voice Continuity Support within 5G System," 3GPP TSG-SA WG1 Meeting #74, S1-161184, Venice, Italy, May 9-13, 2016, Apr. 29, 2016, p. 1.

Supplementary European Search Report—EP 18873198—Search Authority—Munich—Jul. 5, 2021.

ZTE, et al., "TS 23.501: P-CR on Discussion and Proposal for the Voice Solution in 5G," SA WG2 Meeting #119, S2-171092, Feb. 13-17, 2017, Dubrovnik, Croatia, Feb. 7, 2017, 3 pages, XP051228352, Retrieved from the Internet: URL: http://www.3gpp.org/ftp/tsg_sa/WG2_Arch/TSGS2_119_Dubrovnik/Docs/. [Retrieved on Feb. 7, 2017].

* cited by examiner

Identify a UE connected to a source base station of the first RAN

1305

Receive a handover message including a voice call continuity handover trigger message indicating a handover of the UE to a target base station associated with a second RAN

1310

Transmit a bypass handover message to a second network device based on the received handover message

1315

1300

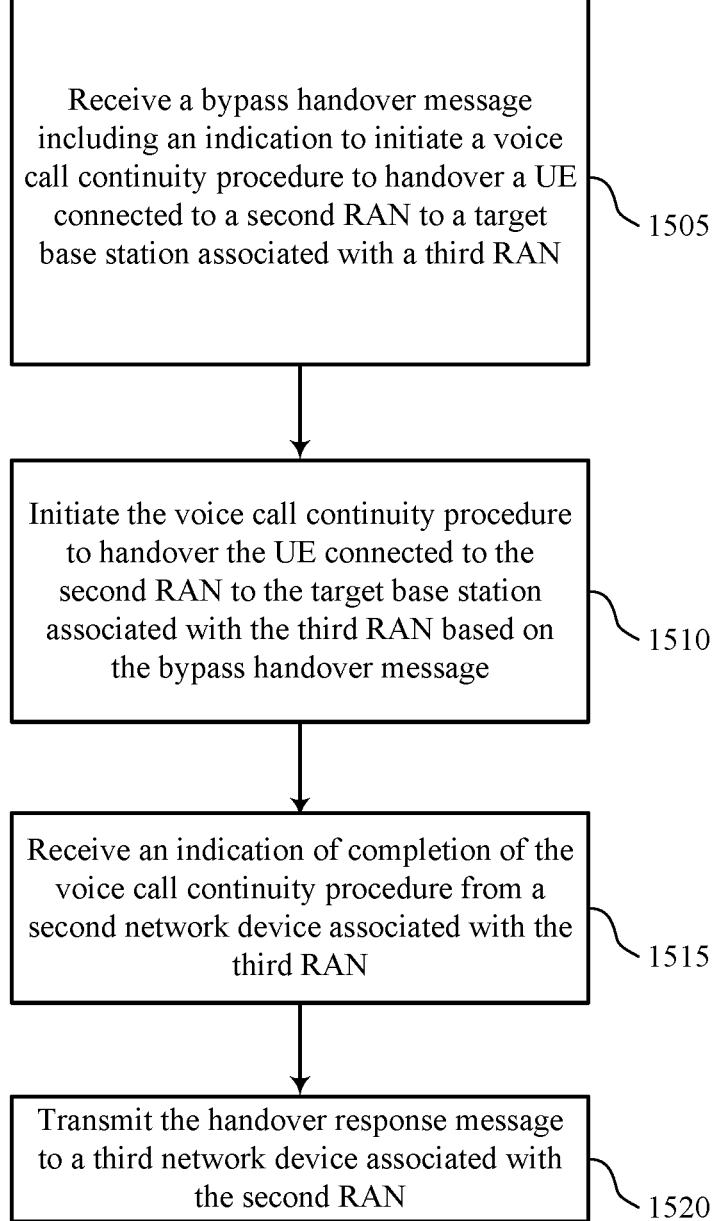

Receive a bypass handover message including an indication to initiate a voice call continuity procedure to handover a UE connected to a second RAN to a target base station associated with a third RAN — 1505

Initiate the voice call continuity procedure to handover the UE connected to the second RAN to the target base station associated with the third RAN based on the bypass handover message — 1510

Receive an indication of completion of the voice call continuity procedure from a second network device associated with the third RAN — 1515

Transmit the handover response message to a third network device associated with the second RAN — 1520

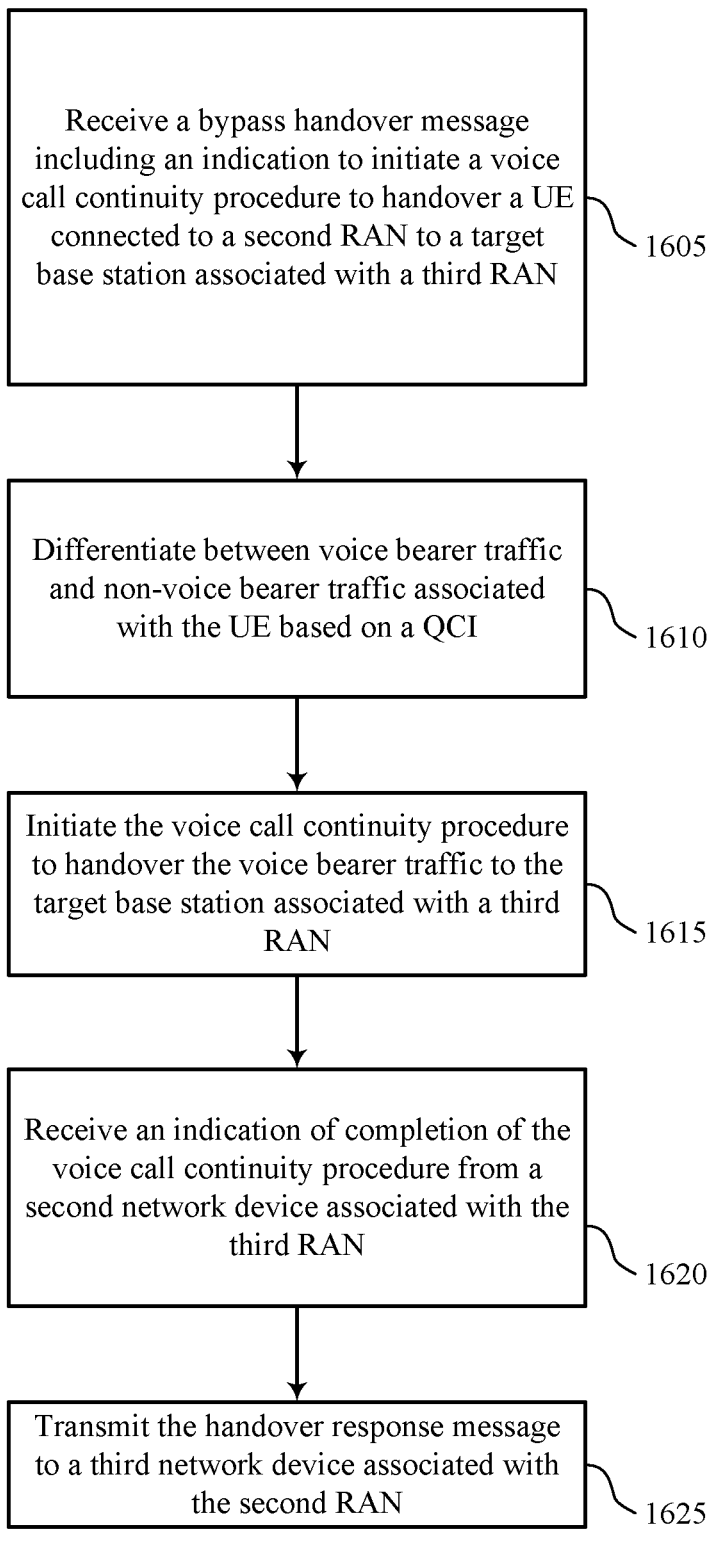

Receive a bypass handover message including an indication to initiate a voice call continuity procedure to handover a UE connected to a second RAN to a target base station associated with a third RAN

1605

Differentiate between voice bearer traffic and non-voice bearer traffic associated with the UE based on a QCI

1610

Initiate the voice call continuity procedure to handover the voice bearer traffic to the target base station associated with a third RAN

1615

Receive an indication of completion of the voice call continuity procedure from a second network device associated with the third RAN

1620

Transmit the handover response message to a third network device associated with the second RAN

INDIRECT SINGLE RADIO VOICE CALL CONTINUITY

CROSS REFERENCES

The present application is a divisional application of U.S. patent application Ser. No. 16/759,776 by Zhang et al., titled "INDIRECT SINGLE RADIO VOICE CALL CONTINUITY," filed Apr. 28, 2020, which is a 371 national phase of International Patent Application No. PCT/CN2018/112094 by Qualcomm Incorporated et al., titled "INDIRECT SINGLE RADIO VOICE CALL CONTINUITY," filed Oct. 26, 2018, which claims priority to International Patent Application No. PCT/CN2017/108536 by Qualcomm Incorporated et al., titled "INDIRECT SINGLE RADIO VOICE CALL CONTINUITY," filed Oct. 31, 2017. All of said applications are assigned to the assignee hereof and are expressly incorporated by reference herein as if fully set forth below and for all applicable purposes.

BACKGROUND

The following relates generally to wireless communication, and more specifically to indirect Single Radio Voice Call Continuity (SRVCC).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some examples of the wireless communications systems, a UE may use Voice Over New Radio (VoNR) to receive a mobile terminated (MT) call or to initiate a mobile originated (MO) call. In some cases, where VoNR is not supported, many operators may rely on LTE systems to provide voice service in 5G systems. In such systems, when a UE receives an MT call or initiates an MO call, the 5G system may initiate a fallback procedure for the UE to fall back to an LTE system for voice service. In some cases, if the UE moves out of the coverage of a 5G system, then the operators may rely on an LTE system for voice calls. More specifically, operators may utilize Voice over LTE (VoLTE) to provide voice service to UEs moving out of 5G systems. However, if VoLTE is not supported by the LTE system, then the UE may further fall back to a second generation/third generation (2G or 3G) system for voice service. Currently, there is no direct interface between 5G systems and 2G or 3G systems. Without a direct interface, a voice call setup may fall back from 5G system to an LTE system to 2G or 3G systems using a two-step fallback procedure that is inefficient and may hamper the user experience.

SUMMARY

The described techniques relate to improved methods, systems, devices, or apparatuses that support indirect Single Radio Voice Call Continuity (SRVCC). For example, in fifth generation (5G) or New Radio (NR) systems, a user equipment (UE) may use Voice over New Radio (VoNR) to initiate and receive voice calls. In some cases, a UE may initiate handover of the voice call to a different network to maintain call continuity if the UE moves out of the coverage of a 5G system. The operators may then rely on Long Term Evolution (LTE) systems to provide voice service. If, however, Voice Over LTE (VoLTE) is not supported by the UE and/or the network, then the UE may further fall back to a second generation/third generation (2G or 3G) system for voice service. Currently, there is no direct interface between 5G systems and 2G or 3G systems. The described techniques relate to a method for a bypass handover from a 5G system to a 2G or 3G system using an indirect SRVCC procedure.

In one example of the described techniques, a UE may be registered to a 5G system including a Next Generation (NG) radio access network (RAN). Decline in channel conditions or other events may trigger a handover to move the voice call to a 2G or 3G system. A base station (e.g., a giga-node B (gNB)) associated with the NG RAN may send a measurement configuration including 2G or 3G system information to the UE. The UE may utilize the measurement configuration to measure neighboring 2G or 3G base stations and further may determine a target base station based on the measurements. Upon determining the target base station, the UE may send a measurement report to the gNB. Based on the measurement report, the gNB may trigger a handover procedure to transfer the UE from the 5G system to a 2G or 3G system. In some examples, the gNB may send a handover message to a network device (e.g., an access and mobility management function (AMF)) associated with the NG RAN. In some cases, the AMF may select a mobility management entity (MME) associated with an Evolved Universal Terrestrial Radio Access Network (E-UTRAN) system, to transfer the handover message. The MME may then relay the handover message to a Mobile Switching Center (MSC) server associated with the 2G or 3G system. In some examples, upon receiving the handover message, the MME may initiate an SRVCC procedure to transfer the UE to the target base station in the 2G or 3G system.

A method of wireless communication is described. The method may include identifying, by a first network device associated with a first RAN, a UE connected to a source base station of the first RAN, receiving, by the first network device, a handover message including a voice call continuity handover trigger message indicating a handover of the UE to a target base station associated with a second RAN, and transmitting a bypass handover message to a second network device based on the received handover message, the bypass handover message including the voice call continuity handover trigger message.

An apparatus for wireless communication is described. The apparatus may include means for identifying, by a first network device, a UE connected to a source base station of the first RAN, means for receiving, by the first network device, a handover message including a voice call continuity handover trigger message indicating a handover of the UE to a target base station associated with a second RAN, and means for transmitting a bypass handover message to a second network device based on the received handover message, the bypass handover message including the voice call continuity handover trigger message.

Another apparatus for wireless communication is described. The apparatus may include a processor, memory in electronic communication with the processor, and instructions stored in the memory. The instructions may be operable to cause the processor to identify, by a first network device associated with a first RAN, a UE connected to a source base station of the first RAN, receive, by the first network device, a handover message including a voice call continuity handover trigger message indicating a handover of the UE to a target base station associated with a second RAN, and transmit a bypass handover message to a second network device based on the received handover message, the bypass handover message including the voice call continuity handover trigger message.

A non-transitory computer-readable medium for wireless communication is described. The non-transitory computer-readable medium may include instructions operable to cause a processor to identify, by a first network device associated with a first RAN, a UE connected to a source base station of the first RAN, receive, by the first network device, a handover message including a voice call continuity handover trigger message indicating a handover of the UE to a target base station associated with a second RAN, and transmit a bypass handover message to a second network device based on the received handover message, the bypass handover message including the voice call continuity handover trigger message.

Some examples of the method, apparatus, and non-transitory computer-readable medium described above may further include processes, features, means, or instructions for selecting the second network device based on an identification associated with the target base station, a support of the bypass handover message by the second network device, or a combination thereof.

Some examples of the method, apparatus, and non-transitory computer-readable medium described above may further include processes, features, means, or instructions for transmitting a Domain Name System (DNS) query to an Internal DNS (iDNS) to identify the second network device. In some cases, the second network device may be configured to forward the bypass handover message to a third network device, the third network device associated with the second RAN and configured to serve the target base station.

In some examples of the method, apparatus, and non-transitory computer-readable medium described above, the third network device may be an MSC server associated with the second RAN and serving the target base station.

In some examples of the method, apparatus, and non-transitory computer-readable medium described above, the voice call continuity handover trigger message includes an indication for the second network device to initiate an SRVCC procedure to handover the UE from the first RAN to the second RAN.

In some examples of the method, apparatus, and non-transitory computer-readable medium described above, the first network device is associated with the first RAN. In some cases, the first RAN may be a NG RAN, and the second RAN may be a GSM/EDGE Radio Access Network (GERAN) or a Universal Terrestrial Radio Access Network (UTRAN). In some examples of the method, apparatus, and non-transitory computer-readable medium described above, a third RAN may be an E-UTRAN, and the second network device may be associated with the third RAN.

In some examples of the method, apparatus, and non-transitory computer-readable medium described above, the first network device may be an AMF associated with the NG RAN, and the second network device may be an MME associated with the E-UTRAN.

In some examples of the method, apparatus, and non-transitory computer-readable medium described above, the handover message includes at least one of: an identification associated with the target base station, or a source to target transparent Radio Resource Control (RRC) container.

In some examples of the method, apparatus, and non-transitory computer-readable medium described above, the source to target transparent RRC container includes RRC information associated with the target base station.

In some examples of the method, apparatus, and non-transitory computer-readable medium described above, the bypass handover message includes at least one of: an identification associated with the target base station, a source to target transparent RRC container, an indication for the second network device to initiate a voice call continuity procedure to handover the UE from the first RAN to the second RAN, or a context associated with the UE.

Some examples of the method, apparatus, and non-transitory computer-readable medium described above may further include processes, features, means, or instructions for receiving a handover response message from the second network device, the handover response message indicating initiation of the handover of the UE from the source base station to the target base station. Some examples of the method, apparatus, and non-transitory computer-readable medium described above may further include processes, features, means, or instructions for transmitting the handover response message to the source base station.

In some examples of the method, apparatus, and non-transitory computer-readable medium described above, the first network device may have a backhaul connection link with the second RAN.

In some examples of the method, apparatus, and non-transitory computer-readable medium described above, the second network device may have a backhaul connection link with the second RAN.

In some examples of the method, apparatus, and non-transitory computer-readable medium described above, the voice call continuity procedure includes a SRVCC procedure.

A method of wireless communication is described. The method may include receiving, by a first network device, a bypass handover message including an indication to initiate a voice call continuity procedure to handover a UE connected to a second RAN to a target base station associated with a third RAN, initiating the voice call continuity procedure to handover the UE connected to the second RAN to the target base station associated with the third RAN based on the bypass handover message, receiving an indication of completion of the voice call continuity procedure from a second network device associated with the third RAN, where indication of completion of the voice call continuity procedure includes a handover response message, and transmitting the handover response message to a third network device associated with the second RAN.

An apparatus for wireless communication is described. The apparatus may include means for receiving, by a first network device, a bypass handover message including an indication to initiate a voice call continuity procedure to handover a UE connected to a second RAN to a target base station associated with a third RAN, means for initiating the voice call continuity procedure to handover the UE connected to the second RAN to the target base station associated with the third RAN based on the bypass handover message, means for receiving an indication of completion of the voice call continuity procedure from a second network device associated with the third RAN, where indication of completion of the voice call continuity procedure includes a handover response message, and means for transmitting the handover response message to a third network device associated with the second RAN.

Another apparatus for wireless communication is described. The apparatus may include a processor, memory in electronic communication with the processor, and instructions stored in the memory. The instructions may be operable to cause the processor to receive, by a first network device, a bypass handover message including an indication to initiate a voice call continuity procedure to handover a UE connected to a second RAN to a target base station associated with a third RAN, initiate the voice call continuity procedure to handover the UE connected to the second RAN to the target base station associated with the third RAN based on the bypass handover message, receive an indication of completion of the voice call continuity procedure from a second network device associated with the third RAN, where the indication of completion of the voice call continuity procedure includes a handover response message, and transmit the handover response message to a third network device associated with the second RAN.

A non-transitory computer-readable medium for wireless communication is described. The non-transitory computer-readable medium may include instructions operable to cause a processor to receive, by a first network device, a bypass handover message including an indication to initiate a voice call continuity procedure to handover a UE connected to a second RAN to a target base station associated with a third RAN, initiate the voice call continuity procedure to handover the UE connected to the second RAN to the target base station associated with the third RAN based on the bypass handover message, receive an indication of completion of the voice call continuity procedure from a second network device associated with the third RAN, where the indication of completion of the voice call continuity procedure includes a handover response message, and transmit the handover response message to a third network device associated with the second RAN.

Some examples of the method, apparatus, and non-transitory computer-readable medium described above may further include processes, features, means, or instructions for differentiating between voice bearer traffic and non-voice bearer traffic associated with the UE based on a Quality of Service Class Identifier (QCI). Some examples of the method, apparatus, and non-transitory computer-readable medium described above may further include processes, features, means, or instructions for initiating the voice call continuity procedure to handover the voice bearer traffic to the target base station associated with a third RAN.

In some examples of the method, apparatus, and non-transitory computer-readable medium described above, the second RAN may be a NG RAN, and the third RAN may be a GERAN or a UTRAN. In some examples of the method, apparatus, and non-transitory computer-readable medium described above, a first RAN may be an E-UTRAN, and the first network device may be associated with the first RAN.

In some examples of the method, apparatus, and non-transitory computer-readable medium described above, the first network device may be an MME associated with the E-UTRAN, the second network device may be an MSC server associated with the GERAN or an MSC associated with the UTRAN, and the third network device may be an AMF associated with the NG RAN.

In some examples of the method, apparatus, and non-transitory computer-readable medium described above, the bypass handover message includes at least one identification associated with the target base station, a source to target transparent RRC container, an indication for the first network device to initiate the voice call continuity procedure to handover the UE, or a context associated with the UE.

In some examples of the method, apparatus, and non-transitory computer-readable medium described above, the third network device associated with the second RAN does not may have a backhaul connection link with the third RAN. In some examples of the method, apparatus, and non-transitory computer-readable medium described above, the first network device may have a backhaul connection link with the third RAN.

In some examples of the method, apparatus, and non-transitory computer-readable medium described above, the voice call continuity procedure includes a SRVCC procedure.

BRIEF DESCRIPTION OF THE DRAWINGS

FIGS. 13 through 16 illustrate methods for I indirect SRVCC in accordance with aspects of the present disclosure.

DETAILED DESCRIPTION

Figure 1:
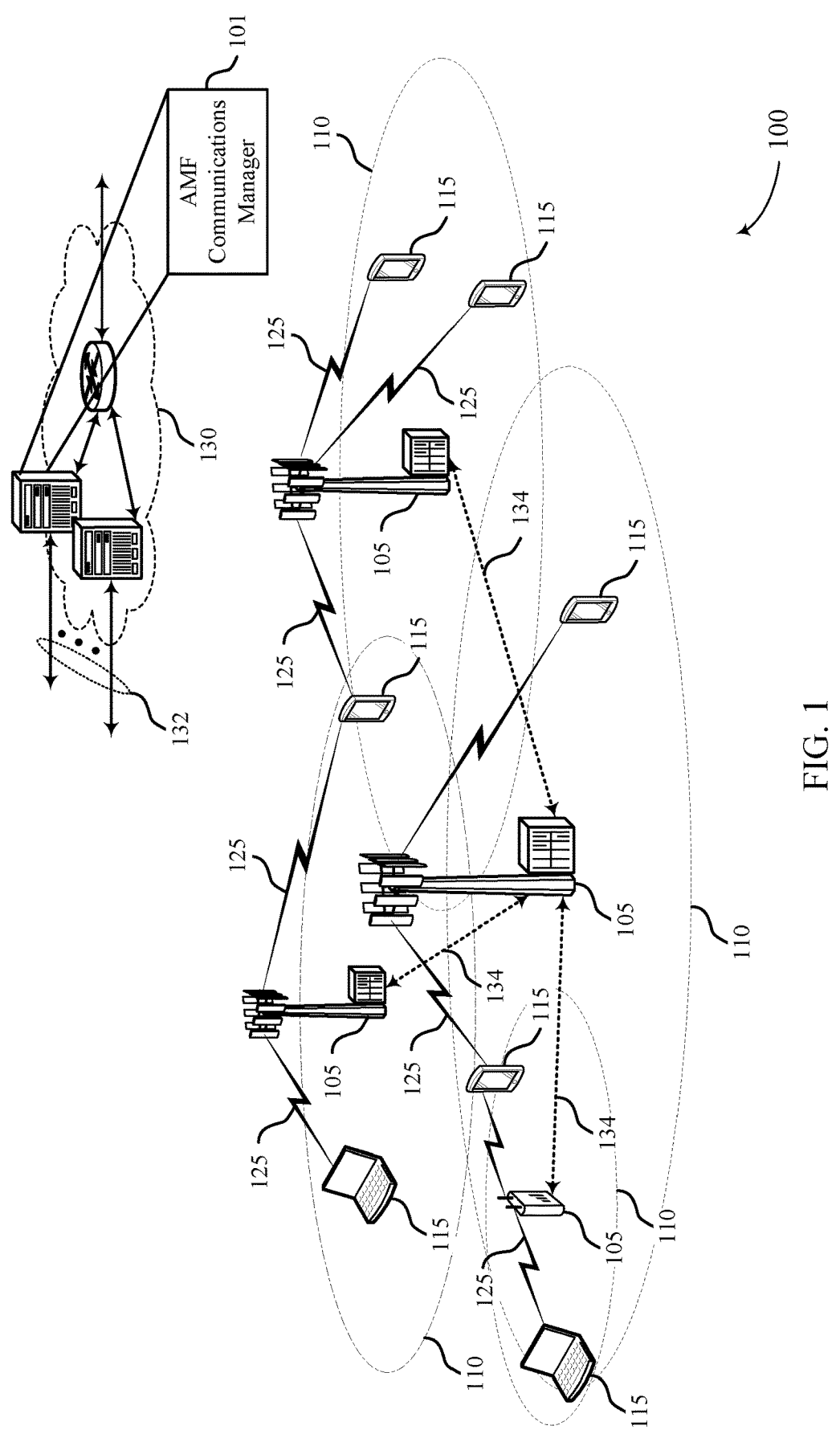
FIG. 1 illustrates an example of a system for wireless communication that supports indirect Single Radio Voice Call Continuity (SRVCC) in accordance with aspects of the present disclosure.

In fifth generation (5G) or New Radio (NR) systems, a user equipment (UE) may use Voice over New Radio (VoNR) to initiate and receive voice calls. In some cases handover of a voice call to a different network may occur to preserve call continuity if the UE moves out of the coverage of a 5G system. Some UEs may support a single radio for voice calls. Under such circumstances, operators may rely on handover to a Long Term Evolution (LTE) system to provide voice service. More specifically, the UE may include functions relating to multiple radio access networks (RATs) (such as 5G, LTE, second generation/third generation (2G or 3G)), but may utilize a single radio (e.g., transceiver) for communicating at a given time. That is, the UE may not support simultaneous communication with multiple cellular RATs using multiple radios. Upon detecting that such a UE is moving out of the coverage area of a 5G system, the 5G system may initiate a fallback procedure for the UE to fall back to an LTE system for voice service. The operators may utilize Voice over LTE (VoLTE) to provide voice service to UEs after the completion of the fallback procedure to LTE systems.

In some examples, 5G systems may support VoNR from a function perspective. More specifically, in some 5G systems, the signaling procedures for VoNR may be supported, but core network functions in the Next Generation (NG) radio access network (RAN) may not be optimized for VoNR. Therefore, such 5G systems may be able to setup a VoNR call but the performance may be unreliable. Additionally, upon degradation of the channel condition, a giga-nodeB (gNB) may initiate a handover of a UE to another voice capable RAT (such as an LTE or a second generation/third generation (2G or 3G) system). In some cases, the channel condition may not meet acceptable standards, and the gNB may perform a fake admission control and may handover the UE to other RATs soon after the VoNR call setup signaling procedure is performed. After the fallback procedure from a 5G system to an LTE system, if VoLTE is not supported, then the UE may further fall back to a 2G or 3G system for voice service.

VoLTE and circuit switched fallback (CSFB) are defined in LTE systems to support voice service. In order to support VoLTE, the LTE operator may deploy an IP Multimedia Subsystem (IMS). Further, the core network of the LTE system may support a Quality of Service Class Identifier (QCI) value of 1. Single Radio Voice Call Continuity (SRVCC) is a fallback procedure that exists for LTE systems. SRVCC is a handover technology between "VoIP over IMS in LTE" and voice call in 2G or 3G systems. In some examples, the core network of the LTE system may maintain a guaranteed bit rate (GBR) bearer to support SRVCC. In some cases, SRVCC is a handover procedure for handover between a packet switched (PS) call in LTE systems and a circuit switched (CS) call in 2G or 3G systems. For LTE systems that support the SRVCC procedure, the core network of the LTE system has a direct interface with the core network of a 2G or 3G system. More specifically, the evolved packet core (EPC) included in the core network of an LTE system may have an interface to the Mobile Switching Center (MSC) server included in the core network of a 2G or 3G system. Such an interface may be a backhaul link connecting the core networks.

Unlike LTE, in 5G systems, there are currently no direct interfaces between components of the core network of a 5G system and components of a core network of a 2G or 3G system. That is, there is no direct interface between a next generation core (NGC) included in the core network of a 5G system, and the MSC server included in the core network of a 2G or 3G system. Without a direct interface between the 5G system and a 2G or 3G system, a voice call setup may fall back from a 5G system to an LTE system, then to a 2G or 3G system. This two-step fallback procedure is inefficient and may hamper the user experience. A UE may utilize the described techniques to perform an indirect SRVCC procedure for fallback from a 5G system to a 2G or 3G system. More specifically, the described techniques relate to methods for performing a bypass fallback procedure through an LTE system to 2G or 3G systems.

In some example 5G systems, when a UE registers in the core network of the 5G system, one or more components of the core network may check whether the UE is capable of supporting voice service using IMS. The core network may further check whether the network supports voice service using IMS. If both UE and network allow the UE to use voice service using IMS, an access and mobility management function (AMF) included in the core network of a 5G system may send a registration accept message and may additionally send a support indication message to the UE. The support indication message may include an IMS voice over PS session support indication. In some cases, to support the UE interworking between a 5G system and a 2G or 3G system without a direct interface, a mobility management entity (MME) may relay messages between the corresponding core networks of the 5G system and the 2G or 3G system. For example, one or more components included in the core network of the LTE system may transfer the handover messages between the AMF included in the core network of the 5G system and the MSC server included in the core network of the 2G or 3G system. The MME may also perform the SRVCC procedure to handover a voice call from a 5G system employing NG RAN to a 2G or 3G system employing GSM/EDGE Radio Access Network (GERAN) or a Universal Terrestrial Radio Access Network (UTRAN).

In one example, a UE registered in a 5G network may establish a voice call using IMS. Due to some conditions, the UE may lose available coverage of the 5G system. In some cases, the NG RAN may trigger a handover to transfer the voice call to a 2G or 3G system. In some examples, if one or more channel conditions and the gNB capability are insufficient to support a performance requirement of VoNR, the gNB may trigger a SRVCC handover procedure to 2G or 3G systems (e.g., systems employing GERAN or UTRAN). In some cases, the gNB may configure the UE to measure 2G or 3G conditions at neighboring cells or base stations. Prior to the handover, in some examples, the gNB may send a measurement request to the UE. The measurement request may in some cases include 2G or 3G system information. For example, to support a handover from the 5G system to a 2G or 3G system, the gNB may request the UE measures nearby 2G or 3G cells. More specifically, the gNB may configure 2G or 3G system information (e.g., cell identifiers, carrier frequencies, RATs, etc.) in the measurement request, and may further direct the UE to report measurements for the 2G or 3G cells.

The UE may utilize the measurement configuration to measure neighboring 2G or 3G cells (e.g., base stations) and may determine a target base station based on the measurements. Upon determining the target base station, the UE may send measurement reports associated with the target base station back to the gNB. Based on UE measurement reports, the gNB may trigger an indirect SRVCC handover procedure to handover the UE from 5G systems associated with NG RAN to 2G or 3G system associated with GERAN or UTRAN. In some examples, the gNB may send a handover required message to a network device included in the core network of the 5G system. In some examples, the gNB may send the handover required message to an AMF included in the core network of the 5G system. In some examples, the handover required message may include an identification associated with the target base station, a source to target transparent Radio Resource Control (RRC) container, and an indication to initiate an SRVCC handover. In some examples, the identification associated with the target base station may indicate an identification of a target base station in 2G or 3G system, and the source to target transparent RRC container may include the RRC information used in a target base station in the 2G or 3G systems.

Upon receiving the handover required message, the AMF may select an MME to transfer the handover required message. In some examples, the AMF may select the MME by configuration or by a Domain Name System (DNS) query. In examples where the AMF selects the MME by configuration, the AMF may locally configure information identifying an MME that is able to forward the message to an MSC server associated with the target base station. In some examples, the AMF may determine the MME that supports the transmission of the handover message and in addition has a backhaul connection with the MSC server supporting the target base station in 2G or 3G system. Alternatively, the AMF may use a DNS query to an Internal DNS (iDNS) to identify the MME capable of forwarding the handover message to an MSC server.

In some implementations, the AMF associated with the NG RAN may select an MME associated with Evolved Universal Terrestrial Radio Access Network (E-UTRAN) to forward the handover required message it may receive from a gNB. The AMF may then transmit a bypass handover message to the MME. For example, the AMF may instruct the MME to bypass the handover of a UE from a 5G system to the E-UTRAN for an LTE system, and to initiate an SRVCC procedure to handover the UE from the 5G system to a 2G or 3G system. In some examples, the bypass handover message may be based on the handover required message and may be referred to as an uplink forward information message. For example, the bypass handover message may include an identification associated with the target base station, a source to target transparent RRC container, an indication for the MME to initiate a voice call continuity procedure to handover the UE from the 5G system to the 2G or 3G system, and a context associated with the UE. In some examples, the AMF may generate the bypass handover message upon receiving the handover required message from the gNB. For example, the AMF may include all information received in the handover required message in the bypass handover message.

The MME may receive the bypass handover message and may determine a target node B (NB) (e.g., base stations associated with the 2G or 3G system). In some examples, the MME may select the MSC server associated with the target NB. In some examples, the MME may determine that the bypass handover message includes an indication to initiate a voice call continuity procedure to handover a UE from a 5G system to a 2G or 3G system. Upon receiving the bypass handover message, the MME may initiate an SRVCC procedure to handover the UE to the target base station in 2G or 3G system.

In some examples, the MME may receive an indication of completion of the voice call continuity procedure from the MSC server serving the target base station in 2G or 3G systems. The MME may then relay the received message to the AMF associated with an NG RAN. The AMF may further transmit the handover command to the UE. In some examples, the handover message may include information provided by the target base station in 2G or 3G system. The UE may utilize the received information to access the target base station in 2G or 3G systems. Upon successful completion of the handover procedure, the UE may send a handover complete message to the target base station associated with GERAN or UTRAN (e.g., 2G or 3G systems). The UE may then be configured to perform a voice call using the CS connection of 2G or 3G systems.

In some examples, a UE may include a first set of functions related to 2G or 3G systems, a second set of functions related to LTE systems, and third set of functions related to 5G systems. In some cases, the UEs registered to the 5G system may include an interface between the first set of functions related to 2G or 3G systems and the third set of functions related to 5G systems. Thus, the UE may utilize the third set of functions related to 5G systems to receive a handover response message from the gNB. Upon receiving the handover response message, the UE may send the message from the third set of functions related to 5G systems to the first set of functions related to 2G or 3G systems.

Thus, the described techniques may optimize the two-step fallback procedure. For two-step fallback procedures, the UE performs the entire handover procedure from a 5G system to an LTE system, and then performs another handover from the LTE system to 2G or 3G systems. In the described techniques, no handover occurs to the E-UTRAN associated with the LTE system. The techniques describe methods for a direct handover from 5G system to 2G or 3G systems using an indirect SRVCC procedure via an LTE system.

Aspects of the disclosure are initially described in the context of a wireless communications system. More specifically, aspects of the disclosure are directed to methods supporting indirect SRVCC procedure for handover of a UE from 5G system to a 2G or 3G systems. Aspects of the disclosure further illustrated by and described with reference to apparatus diagrams, system diagrams, and flowcharts that relate to indirect SRVCC.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be an LTE network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or another interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an EPC, which may include at least one MME, at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

In some examples, the core network 130 may include an AMF communications manager 101. According to some examples, the AMF communications manager 101 may be associated with the 5G or NR system. The AMF communications manager 101 may identify UE 115 connected to a source base station 105 associated with NG RAN of a 5G system. The AMF communications manager 101 may further receive a handover message including a voice call continuity handover trigger message. The handover message may indicate a handover of the UE 115 to a target base station associated with a second RAN. In some examples, the second RAN may be GERAN or UTRAN. In some examples, the AMF communications manager 101 may receive the handover message from the source base station 105. The AMF communications manager 101 may then transmit a bypass handover message to a second network device based on the received handover message. In some cases, the second network device may be associated with a third RAN, such as an MME associated with E-UTRAN.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s = 1/30,720,000$ seconds. Time intervals of a communications resource may be organized according to radio frames each having a duration of 10 milliseconds (ms), where the frame period may be expressed as $T_f = 307,200 \, T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Figure 2:
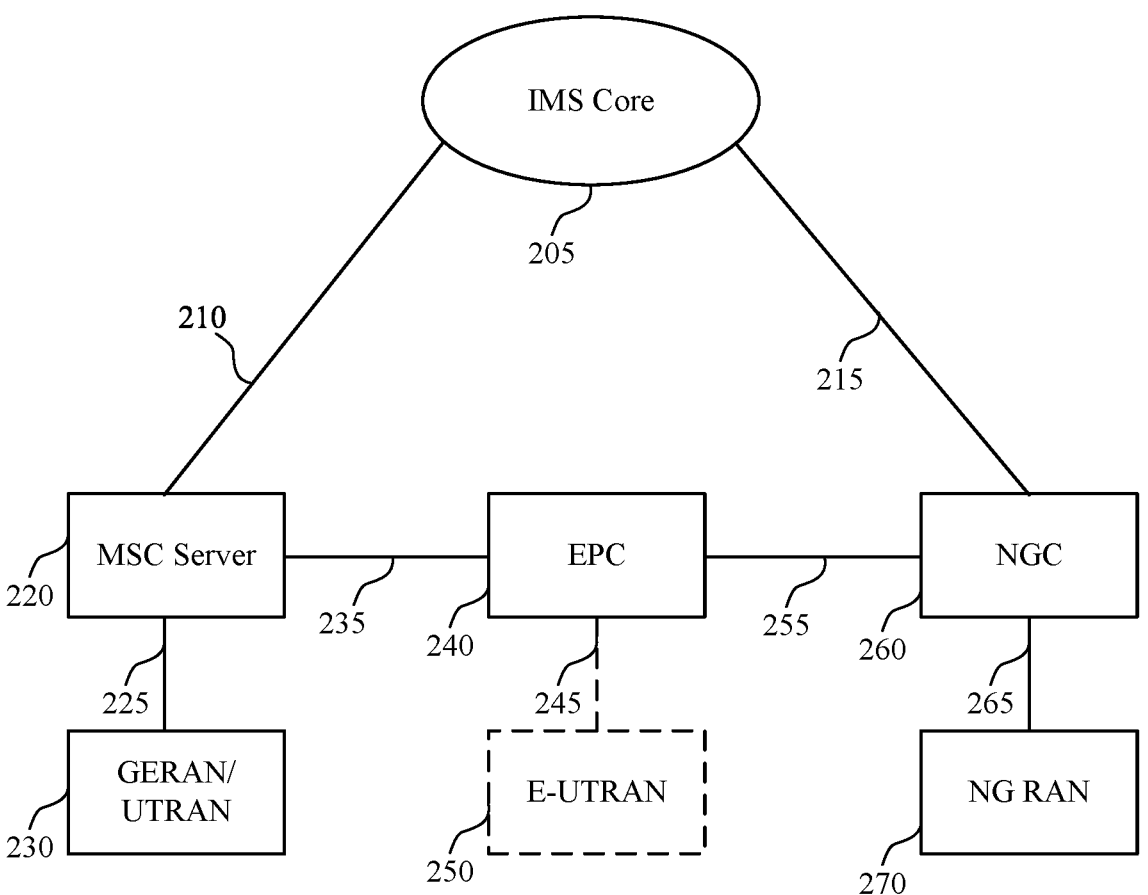
FIG. 2 illustrates an example of a 5G deployment scenario 200 that supports Indirect SRVCC in accordance with aspects of the present disclosure.

FIG. 2 illustrates an example of a 5G deployment scenario 200 that supports indirect SRVCC in accordance with various aspects of the present disclosure. In some examples, the 5G deployment scenario 200 may implement aspects of wireless communications system 100.

As previously discussed, in 5G or NR systems, a UE (not shown) may use VoNR to initiate and receive voice calls. The UE may be an example of UE 115 as described with reference to FIG. 1. In some examples, NGC 260 and the IMS Core 205 may support VoNR. The IMS Core 205 may be an example of the IMS discussed previously. For example, the UE associated with NG RAN 270 may be configured to connect with NGC connection 265. To complete a voice call in NR systems, the NGC 260 may connect to the IMS Core 205 using connection 215. Upon successful establishment of connection, the UE may use VoNR using the IMS Core 205. In the example of FIG. 2, the 5G deployment scenario supports SRVCC procedure from LTE system through EPC 240 to MSC server 220 in 2G or 3G systems.

In some examples, a UE registered to a 5G network may move out of the coverage of the 5G system. The UE may support a single radio for voice calls. For example, the UE may include functions relating to multiple RATs (such as 5G, LTE, 2G or 3G), but may utilize a single radio for communicating during a particular instance. When a UE moves out of the coverage network, the operators may rely on the EPC 240 associated with the LTE system to provide voice service. In one example of a fallback procedure, a gNB associated with the NG RAN 270 may be configured to access the EPC 240 using E-UTRAN 250 via communication link 245. In another example of a fallback procedure, a gNB associated with the NG RAN 270 may access the EPC 240 without utilizing communication link 245 or E-UTRAN 250. In some cases, the gNB associated with the NG RAN may initiate a fallback procedure for the UE to fall back to the EPC 240 associated with the LTE system for voice service. After the fallback procedure from 5G system to an LTE system, if VoLTE is not supported by EPC 240, then the UE may further fall back to the MSC server 220 in the 2G or 3G system for voice service.

As shown in FIG. 2, NGC 260 does not have a direct interface (e.g., a backhaul link connecting the core networks) with MSC server 220. On the other hand, EPC 240 supports an SRVCC procedure to fall back to the MSC server 220 using connection link 235. In some implementations of LTE systems that support the SRVCC procedure, the core network of the LTE system (EPC 240) has a direct interface 235 with the core network of a 2G or 3G system (MSC server 220). The MSC server may communicate with a target base station in 2G or 3G systems using GERAN or UTRAN 230 via link 225. For voice handover, the MSC server may establish a connection 210 with the IMS core 205 and may transmit a handover response message via connection link 235 to EPC 240. Thus, without a direct interface between the NGC 260 and the MSC server 220, the gNB performs a direct handover from 5G system to 2G or 3G systems using an indirect SRVCC procedure via an LTE system.

Figure 3:
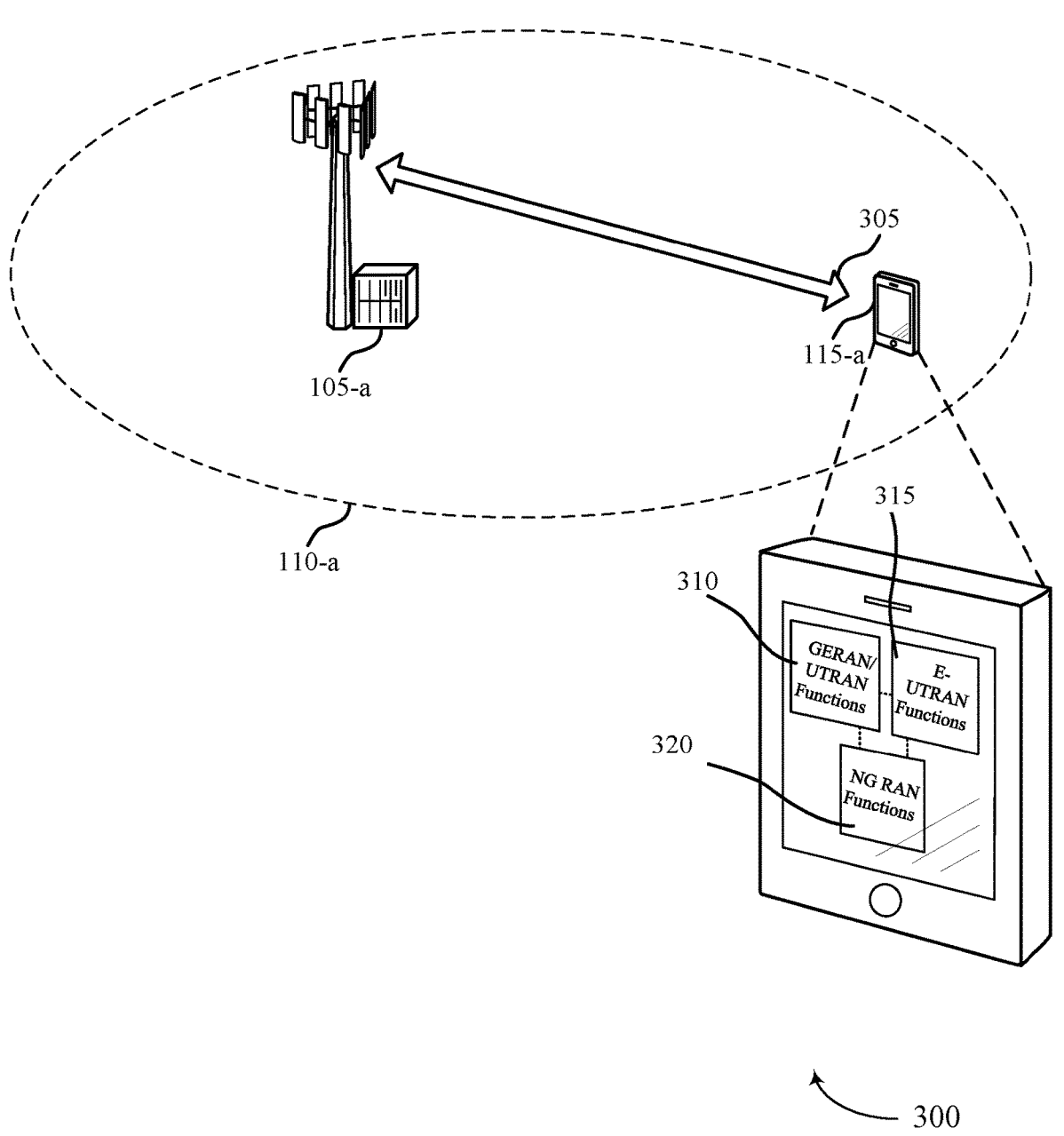
FIG. 3 illustrates an example of a wireless communications system 300 that supports indirect SRVCC in accordance with aspects of the present disclosure.

FIG. 3 illustrates an example of a wireless communications system 300 that supports indirect SRVCC in accordance with various aspects of the present disclosure. In some examples, wireless communications system 300 may implement aspects of wireless communications system 100. In some examples, the wireless communications system 300 may include a base station 105-*a* and UE 115-*a*, which may be examples of the corresponding devices as described with reference to FIG. 1. UE 115-*a* may communicate with the base station 105-*a* within a geographical region 110-*a*. In some cases, the UE 115-*a* and the base station 105-*a* may be associated with 5G system. For example, the UE 115-*a* and the base station 105-*a* may be configured to communicate using technologies associated with NG RAN. In some examples, the geographical region 110-*a* may describe a coverage region of a 5G system.

As explained above, UE 115-*a* may use VoNR for voice services in a 5G system. However, in some cases, the UE moves out of the coverage area 110-*a* of the 5G system. In such cases, voice call handover to a different network may maintain call continuity. For example, the operators may rely on LTE systems to provide voice service if a UE is leaving 5G coverage. If, however, VoLTE is not supported, then the UE 115-*a* may further fall back to 2G or 3G system for voice service. In 5G systems, there are no direct interfaces between components of the core network of a 5G system and components of a core network of a 2G or 3G system. Accordingly, the UE 115-*a* may communicate with base station 105-*a* (gNB) to perform an indirect SRVCC procedure to fall back from 5G system to 2G or 3G system. To support the fallback procedure, the UE 115-*a* may receive a measurement request from base station 105-*a* including information related to 2G or 3G base stations. More specifically, the base station 105-*a* may include RRC information related to 2G or 3G base stations in the measurement request. The UE 115-*a* may utilize the measurement request to identify a target base station associated with GERAN or UTRAN (or base stations which are registered to 2G or 3G systems). Upon identifying the target base station, the UE 115-*a* may send a measurement report to base station 105-*a*. The base station 105-*a* may utilize the information related to the target base station to successfully handover the UE 115-*a* from the 5G system to the 2G or 3G system. More specifically, upon a successful handover procedure, the UE 115-*a* may access the target base station.

In some examples, UE 115-*a* may include a single cellular radio (not shown) but multiple radio software stacks. For example, UE 115-*a* may include a first set of functions 310 related to 2G or 3G systems, a second set of functions 315 related to LTE systems and a third set of functions 320 related to 5G systems. The UE 115-*a* may include an interface between the first set of functions 310 related to 2G or 3G systems and the third set of functions related to 5G systems. Since both base station 105-*a* and UE 115-*a* are registered to a 5G system, upon successful handover, the UE 115-*a* may utilize the third set of functions 320 related to 5G systems to receive a handover response message from the base station 105-*a*. Upon receiving the handover response message, the UE 115-*a* may transmit the message from the third set of functions 320 related to 5G systems to the first set of functions 310 related to 2G or 3G systems. The first set of functions 310 in relation to 2G or 3G systems may then perform the circuit switched voice call with the target base station.

Figure 4:
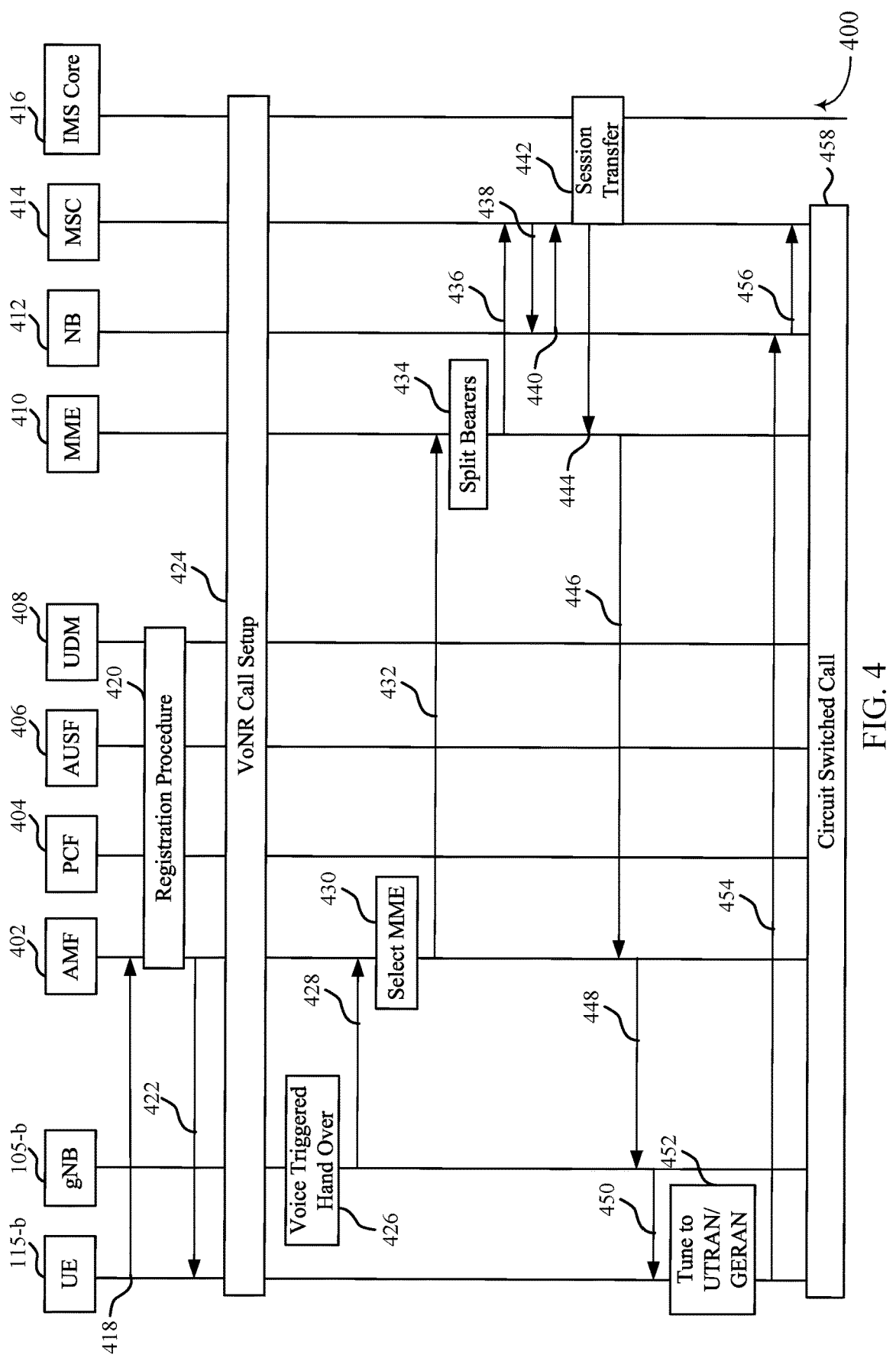
FIG. 4 illustrates an example of a process flow 400 that supports indirect SRVCC in accordance with aspects of the present disclosure.

FIG. 4 illustrates an example of a process flow 400 that supports indirect SRVCC in accordance with various aspects of the present disclosure. In some examples, process flow 400 may implement aspects of wireless communications system 100. Process flow 400 may include UE 115-*b*, gNB 105-*b*, AMF 402, policy control function (PCF) 404, authentication server function (AUSF) 406, unified data management (UDM) 408, MME 410, NB 412, MSC server 414, and IMS Core 416. Process flow 400 may also include UE 115-*b*, which may be an example of a UE 115 or UE 115-*a*, as described with reference to FIGS. 1 and 3. UE 115-*b* implementing an indirect handover procedure from 5G systems to 2G or 3G systems for a voice call may utilize an indirect SRVCC procedure. In the example of FIG. 4, the UE 115-*b*, the gNB 105-*b*, the AMF 402, the PCF 404, the AUSF 406, and the UDM 408 are associated with a 5G system. Additionally, the MME 410 may in some cases be associated with an LTE system while the NB 412 and the MSC server 414 may be associated with a 2G or 3G system.

As previously discussed, current 5G NR systems do not have a direct interface with 2G or 3G systems. For example, there are no direct interfaces between components of the core network of the 5G system and components of a core network of the 2G or 3G system. In the example of FIG. 4, there are no direct backhaul links between AMF 402 and MSC server 414. However, there are backhaul links between MME 410 associated with the LTE network and an MSC associated with 2G or 3G networks. In some examples, UE 115-*b* may use VoNR to initiate MO voice calls and receive MT voice calls.

At step 418, the UE 115-*b* may register with the 5G network. When the UE 115-*b* registers in the 5G system, the gNB 105-*b* and/or the AMF 402 may be configured to check whether the UE 115-*b* is capable to support voice service using the IMS core 416. The gNB 105-*b* and/or the AMF 402 may further be configured to check whether the network supports voice service using the IMS core 416.

At step 420, as part of the registration procedure, the AMF 402 may select an AUSF 406 to authorize the UE 115-*b*. The AUSF 406 may receive the registration request from the AMF 402 and may retrieve subscription information associated with the UE 115-*b* from UDM 408. The AUSF 406 may further retrieve mobility management (MM) related policy control information from PCF 404.

At step 422, upon successful registration, the AMF 402 may send a registration accept message to the UE 115-*b*. For example, if the AMF 402 determines that both UE 115-*b* and the network allow the UE 115-*b* to use voice service using the IMS core 416, the AMF 402 may send a registration accept message. In some examples, the registration accept message may include a support indication message to the UE. The support indication message may include an IMS voice over PS session support indication. At step 424, a VoNR call is set up for the UE 115-*b*.

In some examples, 5G systems may not be optimized for VoNR. For example, one or more 5G systems may be able to setup a VoNR call but the performance may not be ensured by the core network. In such cases, or upon degradation of channel conditions, the gNB 105-*b* may initiate a voice triggered handover procedure for the UE 115-*b*. For example, the gNB 105-*b* may initiate a handover procedure for the UE 115-*b* to another voice capable RAT (such as LTE, second generation/third generation (2G or 3G). In some cases, if VoLTE is not supported, then the UE 115-*b* may further fall back to 2G or 3G systems for voice service. According to various aspects, in the absence of a direct backhaul interface between the 5G system and the 2G or 3G system, an indirect SRVCC fallback procedure may be performed for a voice call from 5G system to a 2G or 3G system via LTE.

At step 426, if the channel conditions and capability of the gNB 105-*b* are insufficient to support the performance requirement of VoNR, the gNB 105-*b* may trigger a voice triggered handover procedure to 2G or 3G systems (e.g., systems employing GERAN or UTRAN). In one example, the gNB 105-*b* may configure the UE 115-*b* to measure the 2G or 3G neighboring base stations for handover.

At step 428, the gNB 105-*b* may send a measurement request to the UE. The measurement request may include 2G or 3G system information. For example, the gNB may request that the UE measure nearby 2G or 3G cells to support handover from the 5G system to a 2G or 3G system. More specifically, the gNB may configure 2G or 3G system information in the measurement request for the UE to report neighboring base stations associated with 2G or 3G systems. For example, the gNB 105-*b* may send a measurement request (not shown) to UE 115-*b*. The measurement request may include, for example, carrier frequencies, cell identifiers, and RAT information associated with cells of neighboring 2G or 3G base stations. The UE 115-*b* may utilize the measurement request to detect and measure the cells of one or more neighboring 2G or 3G base stations. The UE 115-*b* may then determine a target base station based on the measurements. Upon determining the target base station, the UE 115-*b* may send measurement reports associated with the target base station back to the gNB 105-*b*.

Upon receiving the measurement reports associated with the target base station in 2G/3G system, the gNB 105-*b* may generate a handover required message. At step 428, the gNB 105-*b* may send the generated handover required message to the AMF 402 associated with the 5G system. In some examples, the gNB 105-*b* may include an identification associated with the target base station, a source to target transparent RRC container, and an indication to initiate an SRVCC handover, in the handover required message. In some examples, the identification associated with the target base station may be based on the measurement reports received from UE 115-*b*. In some examples, the identification associated with the target base station may identify a target base station in the 2G or 3G system, and the source to target transparent RRC container may include the RRC information used in base stations in 2G or 3G systems.

At step 430, the AMF 402 may select an MME to relay the handover required message. In some cases, the MME may be included in an LTE system. In other cases, the MME may be configured to assist with handover between a 5G system and a 2G or 3G system but may be separate from an active or "live" LTE system—at least insofar as not handling other functionalities within the active LTE system—which may beneficially avoid burdening one or more MMEs included in the active LTE system. In some examples, upon receiving the handover required message, the AMF 402 may select the MME 410 using a local configuration. In some examples, the AMF 402 may select the MME 410 by a DNS query. In some implementations, the AMF 402 may locally configure information identifying the MME 410 as capable of forwarding the handover required message to an MSC server 414 that serves the target base station. Additionally or alternatively, prior to selection of the MME 410, the AMF 402 may determine that the MME 410 supports the transmission of the handover message, and has a backhaul connection with the MSC server 414. In some implementations, the AMF may use a DNS query to an iDNS to identify the MME 410 capable of forwarding the handover message to the MSC server 414.

At step 432, the AMF 402 may transmit a bypass handover message to the selected MME 410. For example, the AMF 402 may indicate the MME 410 to bypass the handover of the UE 115-*b* from 5G system to LTE system, and instead initiate an SRVCC procedure to handover the UE 115-*b* from 5G system to 2G or 3G system. In some examples, prior to transmitting, the AMF 402 may generate the bypass handover message based on the received handover required message. In some examples, the bypass handover message may be referred to as an uplink forward information message. For example, the bypass handover message may include an identification associated with the target base station, a source to target transparent RRC container, an indication for the MME 410 to initiate a voice call continuity procedure to handover the UE 115-*b* from the 5G system to the 2G or 3G system, and a context associated with the UE 115-*b*. In some examples, the AMF 402 may include all information received in the handover required message in the bypass handover message. In some examples, the AMF 402 may modify the received handover required message to generate the bypass handover message.

At step 434, the MME 410 may receive the bypass handover message and may initiate an SRVCC procedure to handover the UE 115-*b*. In some implementations, the MME 410 may different between voice bearer traffic and non-voice bearer traffic associated with the UE 115-*b* based on a QCI.

For example, the MME 410 may determine voice bearer traffic for QCI value 1, and the MME 410 may determine the remaining traffic as non-voice bearer traffic.

At step 436, the MME 410 may transmit the bypass handover message to the MSC server 414. In some examples, the MSC server 414 may be configured to interwork the handover. In other examples, the handover of the UE 115-*b* from 5G system to 2G or 3G system may be a PS to CS handover. In some examples, the MSC server 414 may receive the PS to CS handover request from the MME 410. In some examples, the PS to CS handover request may be a relay of the bypass handover message including an identification associated with the target base station, a source to target transparent RRC container, an indication for the MSC server 414 to initiate a handover of the UE 115-*b* from the 5G system to the 2G or 3G system, and a context associated with the UE 115-*b*. In some examples, the MSC server 414 may send a prepare handover request message to a target MSC (not shown). In some examples, the MSC server 414 may determine a target MSC associated with the target base station. For example, the target MSC may be the MSC server serving the target base station. In some cases, the target MSC may be MSC server 414. In some other cases, the MSC server 414 may forward the bypass handover message to a target MSC and may send the prepare handover request message to the target MSC.

At step 438, upon receiving the indication of handover, the target MSC (MSC server 414 in this example) may perform a resource allocation with the target base station in the 2G or 3G system. In some examples, the target base station may be NB 412.

At step 440, the NB 412 (e.g., target base station) may accept the resource allocation received from the target MSC (MSC server 414 in this case). Upon accepting the resource allocation, the NB 412 may transmit a handover acknowledgment message to the MSC server 414.

At step 442, the MSC server 414 may determine establishment of a circuit connection between the MSC server 414 and an MGW (not shown) associated with the MSC server 414. In some cases, if the MSC server selects another target MSC to interwork the handover, the MSC server 414 may determine establishment of a circuit connection between the target MSC and an MGW associated with the target MSC.

At step 444, the MSC server 414 may send a handover response message to the MME 410. As previously discussed, the MSC server 414 may be associated with 2G or 3G system and the MME 410 may be associated with LTE system.

At step 446, the MME 410 may receive the handover response message. In some examples, the handover response message may include an indication of completion of the voice call continuity procedure from the MSC server 414 serving the target base station in 2G or 3G system. The MME 410 may then relay the received message to the AMF 402 associated with 5G system (e.g., an NG RAN).

At step 448, the AMF 402 may further transmit the handover response message to the gNB 105-*b*. In some examples, the handover response message may include a handover command for the UE 115-*b*. In some examples, the handover response message may include information provided by the target base station in 2G or 3G systems.

At step 450, the gNB may forward the handover command message to the UE 115-*b*. At step 452, the UE 115-*b* may utilize the received information to access the target base station in 2G or 3G system. More specifically, the UE 115-*b* may receive the handover command message from the gNB 105-*b* and may transmit the received information to GERAN or UTRAN protocol layer.

At step 454, the UE 115-*b* may send a handover completion message to the target base station (NB 412 in this example). In some examples, the handover completion message may include an indication of handover completion. At step 456, the target base station (NB 412) may send the handover completion message to the target MSC (MSC server 414).

Upon successful completion of the handover procedure, at step 456, the UE 115-*b* may be configured to perform a voice call using CS method of 2G or 3G systems.

Figure 5:
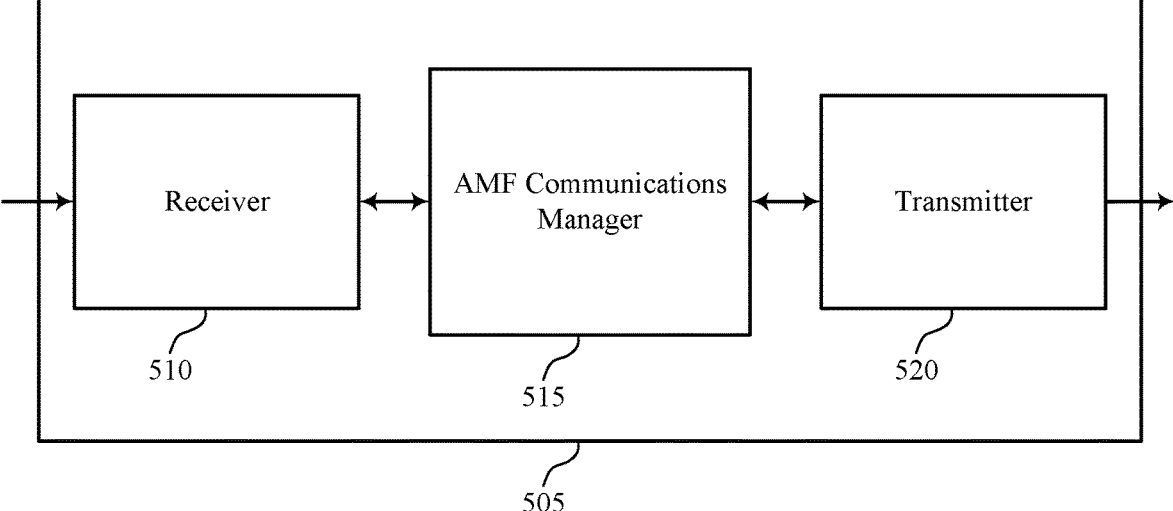
FIGS. 5 through 7 show block diagrams of a device that supports indirect SRVCC in accordance with aspects of the present disclosure.

FIG. 5 shows a block diagram 500 of a wireless device 505 that supports indirect SRVCC in accordance with aspects of the present disclosure. Wireless device 505 may be an example of aspects of an AMF 402 as described herein with reference to FIG. 4. Wireless device 505 may include receiver 510, AMF communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to indirect SRVCC, etc.). Information may be passed on to other components of the device. The receiver 510 may be an example of aspects of the transceiver 835 described with reference to FIG. 8. The receiver 510 may utilize a single antenna or a set of antennas.

AMF communications manager 515 may be an example aspect of the AMF communications manager 815 described with reference to FIG. 8. AMF communications manager 515 and/or at least some of its various sub-components may be implemented in hardware, software executed by a processor, firmware, or any combination thereof. If implemented in software executed by a processor, the functions of the AMF communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The AMF communications manager 515 and/or at least some of its various sub-components may be physically located at various positions, including being distributed such that portions of functions are implemented at different physical locations by one or more physical devices. In some examples, AMF communications manager 515 and/or at least some of its various sub-components may be a separate and distinct component in accordance with various aspects of the present disclosure. In other examples, AMF communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

AMF communications manager 515 may identify a UE connected to a source base station of the first RAN and receive a handover message including a voice call continuity handover trigger message indicating a handover of the UE to a target base station associated with a second RAN.

Transmitter 520 may transmit signals generated by other components of the device. In some examples, the transmitter 520 may be collocated with a receiver 510 in a transceiver. For example, the transmitter 520 may be an example of aspects of the transceiver 835 described with reference to FIG. 8. The transmitter 520 may utilize a single antenna or a set of antennas. Transmitter 520 may transmit a bypass handover message to a second network device based on the received handover message. In some cases, the bypass handover message may include the voice call continuity handover trigger message and transmit the handover response message to the source base station. In some examples, the second network device may be an MME associated with E-UTRAN.

Figure 6:
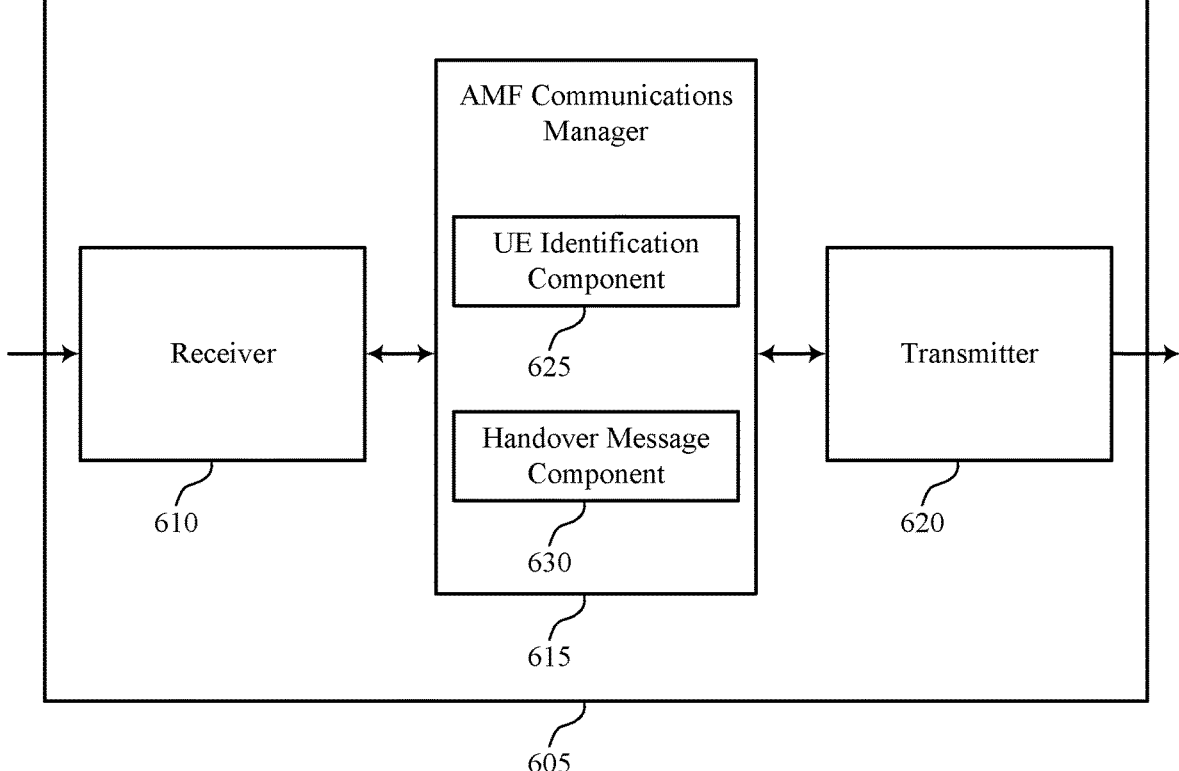

FIG. 6 shows a block diagram 600 of a wireless device 605 that supports indirect SRVCC in accordance with aspects of the present disclosure. Wireless device 605 may be an example of aspects of an AMF 402 or a wireless device 505 as described with reference to FIG. 4 and FIG. 5. Wireless device 605 may include receiver 610, AMF communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to indirect SRVCC, etc.). Information may be passed on to other components of the device. The receiver 610 may be an example aspect of the transceiver 835 described with reference to FIG. 8. The receiver 610 may utilize a single antenna or a set of antennas.

AMF communications manager 615 may be an example of aspects of the AMF communications manager 815 described with reference to FIG. 8. AMF communications manager 615 may also include UE identification component 625 and handover message component 630.

UE identification component 625 may identify a UE connected to a source base station of a first RAN. In some examples, the first RAN may be NG RAN. Handover message component 630 may receive a handover message including a voice call continuity handover trigger message indicating a handover of the UE to a target base station associated with a second RAN. In some cases, the second RAN may be E-UTRAN. In some cases, the voice call continuity handover trigger message includes an indication for the second network device to initiate an SRVCC procedure to handover the UE from the first RAN to the second RAN. In some cases, the handover message includes at least one identification associated with the target base station, or a source to target transparent RRC container. In some cases, the source to target transparent RRC container includes RRC information associated with the target base station.

Transmitter 620 may transmit signals generated by other components of the device. In some examples, the transmitter 620 may be collocated with a receiver 610 in a transceiver. For example, the transmitter 620 may be an example of aspects of the transceiver 835 described with reference to FIG. 8. The transmitter 620 may utilize a single antenna or a set of antennas.

Figure 7:
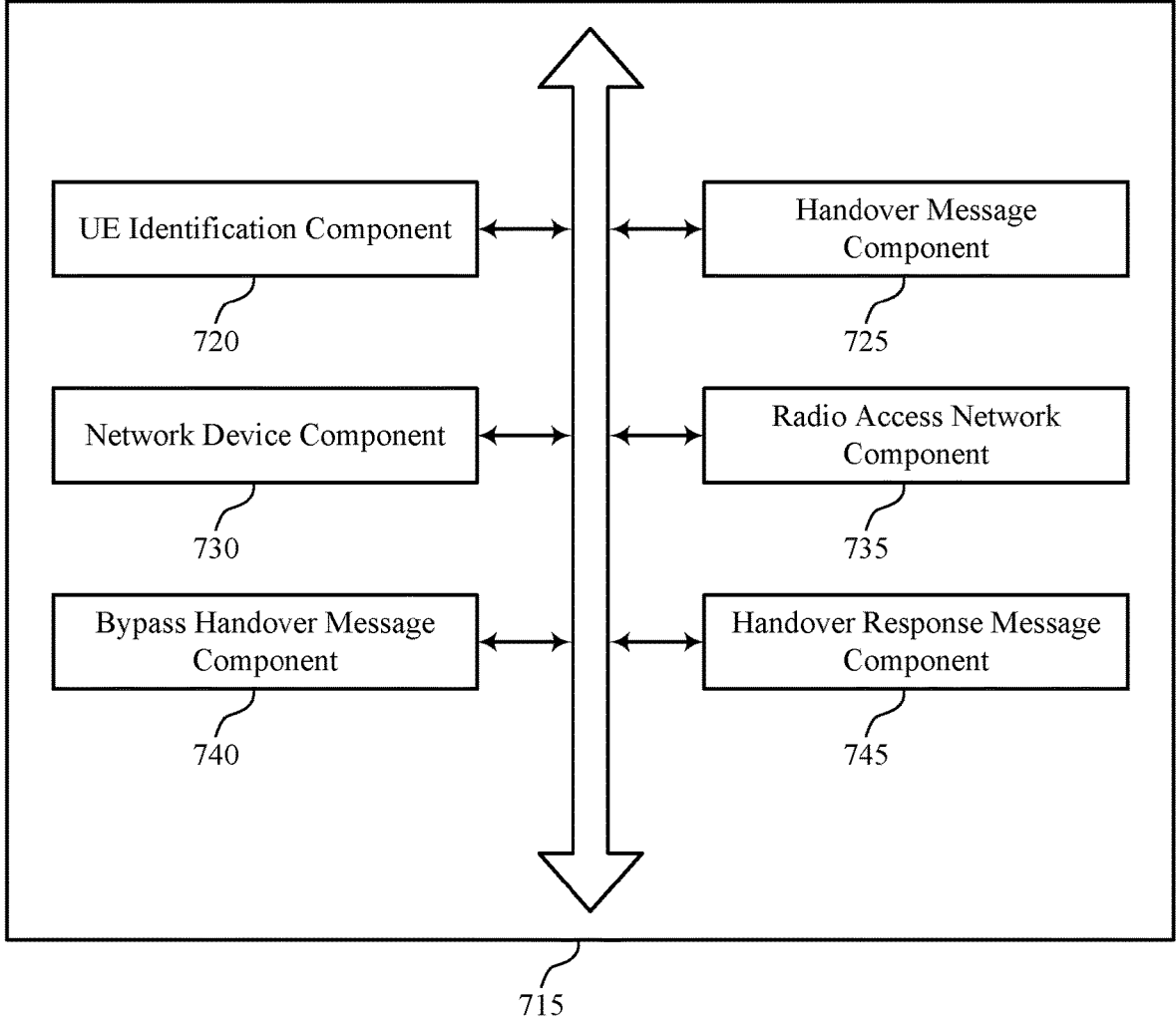

FIG. 7 shows a block diagram 700 of an AMF communications manager 715 that supports indirect SRVCC in accordance with aspects of the present disclosure. The AMF communications manager 715 may be an example of aspects of a AMF communications manager 515, a AMF communications manager 615, or a AMF communications manager 815 described with reference to FIGS. 5, 6, and 8. The AMF communications manager 715 may include UE identification component 720, handover message component 725, network device component 730, radio access network component 735, bypass handover message component 740, and handover response message component 745. Each of these modules may communicate, directly or indirectly, with one another (e.g., via one or more buses).

UE identification component 720 may identify a UE connected to a source base station of a first RAN. Handover message component 725 may receive a handover message including a voice call continuity handover trigger message indicating a handover of the UE to a target base station associated with a second RAN. In some cases, the voice call continuity handover trigger message includes an indication for the second network device to initiate an SRVCC procedure to handover the UE from the first RAN to the second RAN. In some cases, the handover message includes at least one identification associated with the target base station, or a source to target transparent RRC container. In some cases, the source to target transparent RRC container includes RRC information associated with the target base station.

Network device component 730 may transmit a DNS query to an iDNS to identify the second network device. In some cases, the second network device is configured to forward the bypass handover message to a third network device. In some cases, the third network device may be associated with the second RAN and may be configured to serve the target base station. The network device component 730 may further select the second network device based on an identification associated with the target base station, a support of the bypass handover message by the second network device, or a combination thereof. In some cases, the third network device is an MSC server associated with the second RAN and serving the target base station. In some cases, the handover message is received by an AMF associated with the NG RAN, and the second network device is an MME associated with the E-UTRAN. In some cases, the first network device does not have a backhaul connection link with the second RAN. In some cases, the second network device has a backhaul connection link with the second RAN.

Radio access network component 735 may identify RANs associated with each network device. For example, radio access network component 735 may identify that the AMF is associated with NG RAN. Similarly, the radio access network component 735 may identify that the MME is associated with E-UTRAN. In some cases, the first RAN is a NG RAN, the second RAN is a GERAN or a UTRAN, and the third RAN is an E-UTRAN.

Bypass handover message component 740 may generate a bypass handover message based on the received handover message. In some cases, the bypass handover message includes at least one identification associated with the target base station, a source to target transparent RRC container, an indication for the second network device to initiate a voice call continuity procedure to handover the UE from the first RAN to the second RAN, or a context associated with the UE. In some cases, the voice call continuity procedure includes a SRVCC procedure.

Handover response message component 745 may receive a handover response message from the second network device, the handover response message indicating initiation of the handover of the UE from the source base station to the target base station.

Figure 8:
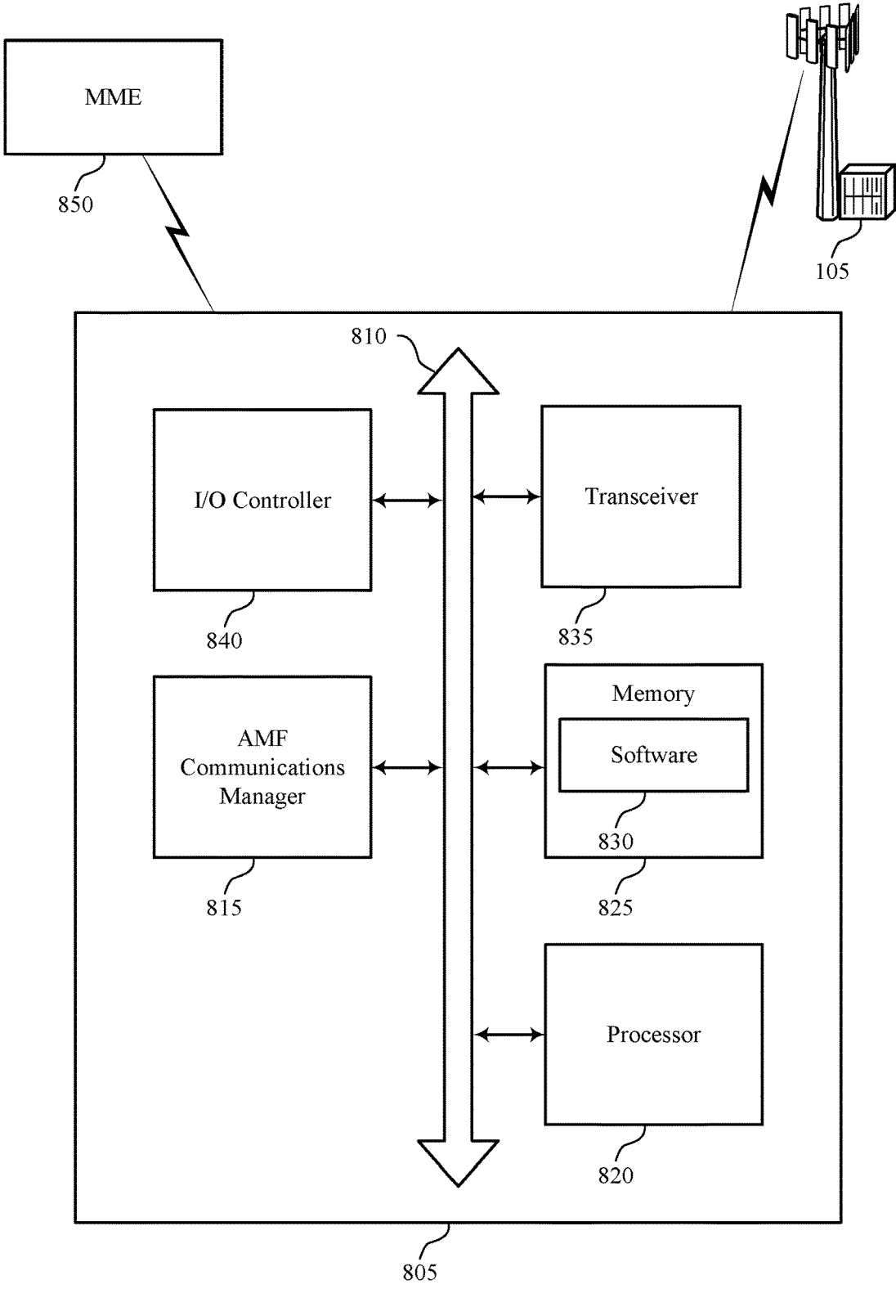
FIG. 8 illustrates a block diagram of a system including an AMF that supports indirect SRVCC in accordance with aspects of the present disclosure.

FIG. 8 shows a diagram of a system 800 including a device 805 that supports indirect SRVCC in accordance with aspects of the present disclosure. Device 805 may be an example of or include the components of an AMF 402, wireless device 505, wireless device 605, as described above, e.g., with reference to FIGS. 4, 5 and 6. Device 805 may include components for bi-directional voice and data communications including components for transmitting and receiving communications, including AMF communications manager 815, processor 820, memory 825, software 830, transceiver 835, and I/O controller 840. These components may be in electronic communication via one or more buses (e.g., bus 810). In some cases, device 805 may be communicatively coupled to MME 850. In some implementations, the device 805 may be associated with NG RAN the MME 850 may be associated with E-UTRAN. For example, MME 850 may be a part of the core network of an LTE system.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting indirect SRVCC).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support indirect SRVCC. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

I/O controller 840 may manage input and output signals for device 805. I/O controller 840 may also manage peripherals not integrated into device 805. In some cases, I/O controller 840 may represent a physical connection or port to an external peripheral. In some cases, I/O controller 840 may utilize an operating system such as iOS®, ANDROID®, MS-DOS®, MS-WINDOWS®, OS/2®, UNIX®, LINUX®, or another known operating system. In other cases, I/O controller 840 may represent or interact with a modem, a keyboard, a mouse, a touchscreen, or a similar device. In some cases, I/O controller 840 may be implemented as part of a processor. In some cases, a user may interact with device 805 via I/O controller 840 or via hardware components controlled by I/O controller 840.

Figure 9:
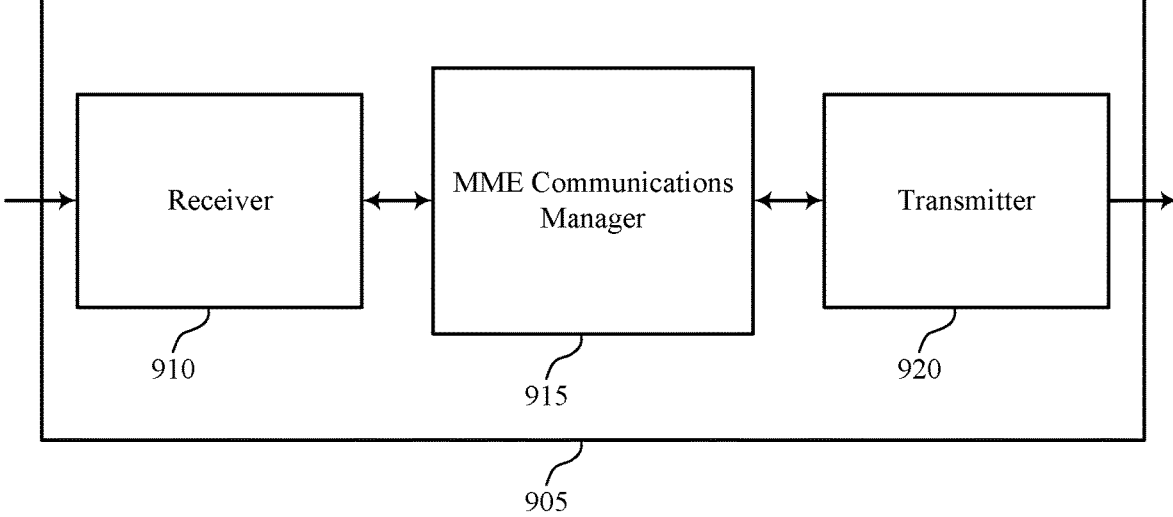
FIGS. 9 through 11 show block diagrams of a device that supports indirect SRVCC in accordance with aspects of the present disclosure.

FIG. 9 shows a block diagram 900 of a wireless device 905 that supports indirect SRVCC in accordance with aspects of the present disclosure. Wireless device 905 may be an example of aspects of an MME 410 as described herein. Wireless device 905 may include receiver 910, MME communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to indirect SRVCC, etc.). Information may be passed on to other components of the device. The receiver 910 may be an example of aspects of the transceiver 1235 described with reference to FIG. 12. The receiver 910 may utilize a single antenna or a set of antennas.

Receiver 910 may receive a bypass handover message including an indication to initiate a voice call continuity procedure to handover a UE connected to a second RAN to a target base station associated with a third RAN.

MME communications manager 915 may be an example of aspects of the MME communications manager 1215 described with reference to FIG. 12. MME communications manager 915 and/or at least some of its various sub-components may be implemented in hardware, software executed by a processor, firmware, or any combination thereof. If implemented in software executed by a processor, the functions of the MME communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The MME communications manager 915 and/or at least some of its various sub-components may be physically located at various positions, including being distributed such that portions of functions are implemented at different physical locations by one or more physical devices. In some examples, MME communications manager 915 and/or at least some of its various sub-components may be a separate and distinct component in accordance with various aspects of the present disclosure. In other examples, MME communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

MME communications manager 915 may receive a bypass handover message from the receiver 910. In some cases, the bypass handover message may include an indication to initiate a voice call continuity procedure to handover a UE connected to a second RAN to a target base station associated with a third RAN. In some cases, the MME communications manager 915 may be associated with E-UTRAN, the UE may be associated with NG RAN, and the target base station may be associated with GERAN OR UTRAN. In some cases, the MME communications manager 915 may initiate the voice call continuity procedure to handover the UE connected to the second RAN to the target base station associated with the third RAN based on the bypass handover message and receive an indication of completion of the voice call continuity procedure from a second network device associated with the third RAN. In some examples, the indication of completion of the voice call continuity procedure includes a handover response message.

Transmitter 920 may transmit signals generated by other components of the device. In some examples, the transmitter 920 may be collocated with a receiver 910 in a transceiver. For example, the transmitter 920 may be an example of aspects of the transceiver 1235 described with reference to FIG. 12. The transmitter 920 may utilize a single antenna or a set of antennas.

Transmitter 920 may transmit the handover response message to a third network device associated with the second RAN. In some cases, the third network device is an AMF associated with NG RAN.

Figure 10:
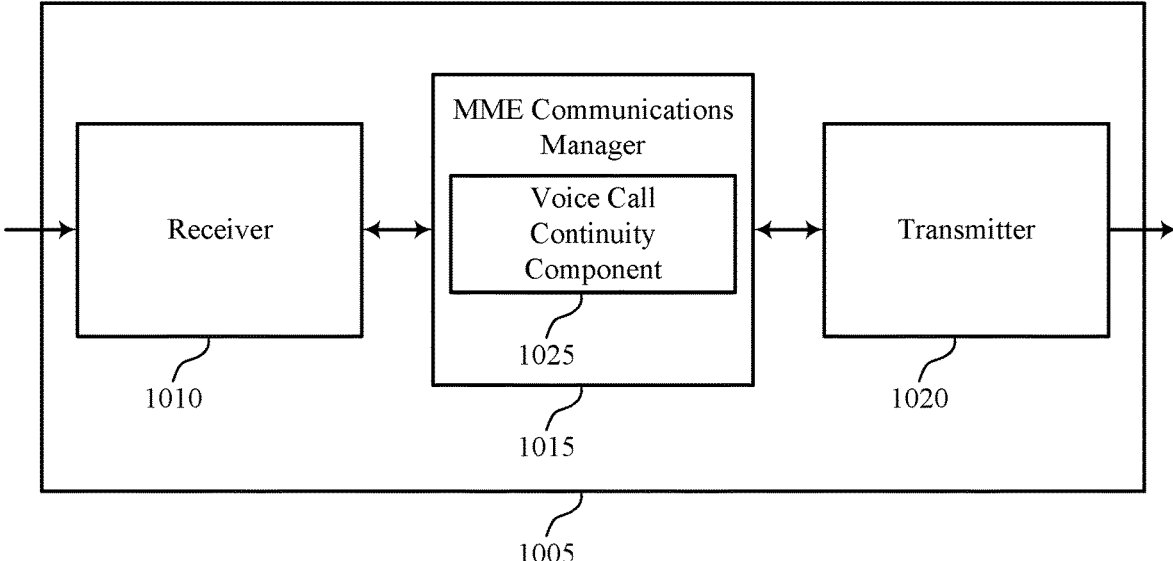

FIG. 10 shows a block diagram 1000 of a wireless device 1005 that supports indirect SRVCC in accordance with aspects of the present disclosure. Wireless device 1005 may be an example of aspects of an MME 410 or a wireless device 905 as described with reference to FIGS. 4 and 9. Wireless device 1005 may include receiver 1010, MME communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to indirect SRVCC, etc.). Information may be passed on to other components of the device. The receiver 1010 may be an example of aspects of the transceiver 1235 described with reference to FIG. 12. The receiver 1010 may utilize a single antenna or a set of antennas.

MME communications manager 1015 may be an example of aspects of the MME communications manager 1215 described with reference to FIG. 12. MME communications manager 1015 may also include voice call continuity component 1025.

Voice call continuity component 1025 may initiate the voice call continuity procedure to handover the voice bearer traffic to the target base station associated with a third RAN, initiate the voice call continuity procedure to handover the UE connected to the second RAN to the target base station associated with the third RAN based on the bypass handover message, and receive an indication of completion of the voice call continuity procedure from a second network device associated with the third RAN. In some cases, the indication of completion of the voice call continuity procedure includes a handover response message. In some examples, the target base station is associated with GERAN OR UTRAN, the UE is associated with NG RAN, and the voice call continuity component 1025 is associated with E-UTRAN.

Transmitter 1020 may transmit signals generated by other components of the device. In some examples, the transmitter 1020 may be collocated with a receiver 1010 in a transceiver. For example, the transmitter 1020 may be an example of aspects of the transceiver 1235 described with reference to FIG. 12. The transmitter 1020 may utilize a single antenna or a set of antennas.

Figure 11:
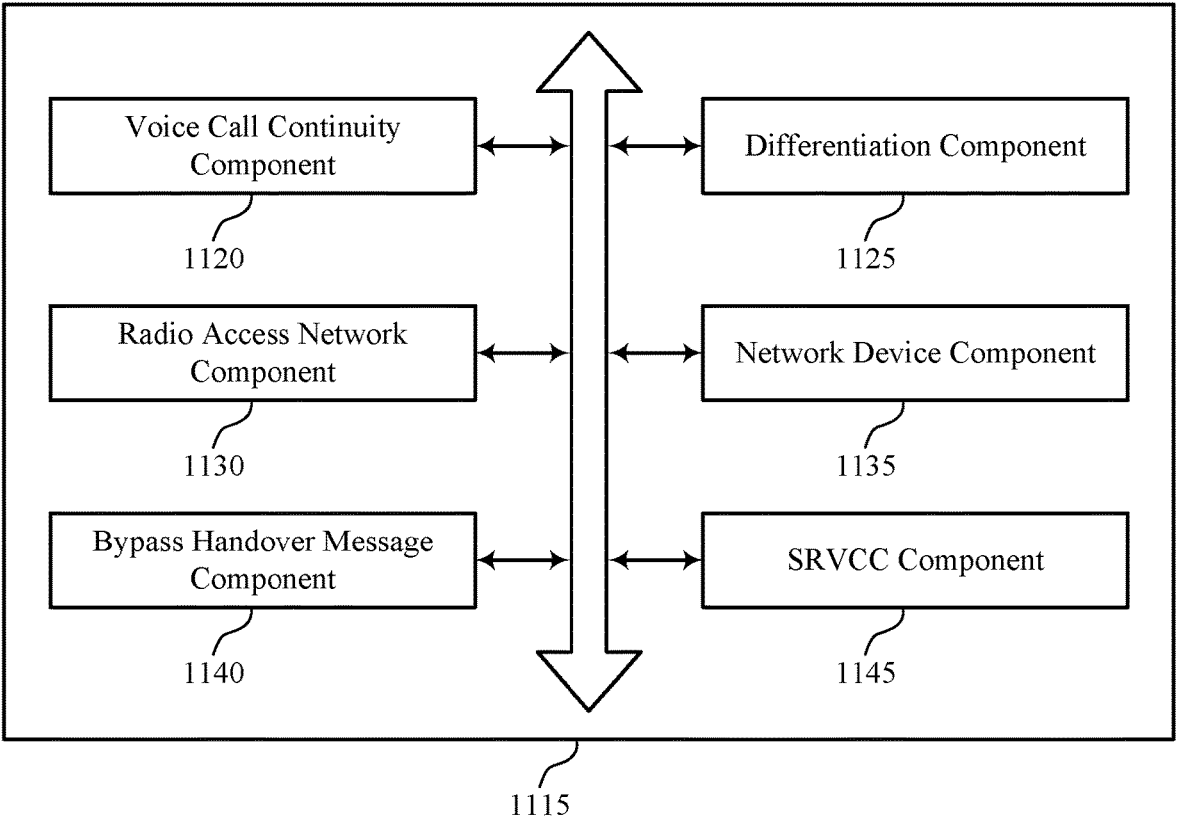

FIG. 11 shows a block diagram 1100 of an MME communications manager 1115 that supports indirect SRVCC in accordance with aspects of the present disclosure. The MME communications manager 1115 may be an example of aspects of an MME communications manager 1215 described with reference to FIGS. 9, 10, and 12. The MME communications manager 1115 may include voice call continuity component 1120, differentiation component 1125, radio access network component 1130, network device component 1135, bypass handover message component 1140, and SRVCC component 1145. Each of these modules may communicate, directly or indirectly, with one another (e.g., via one or more buses).

Voice call continuity component 1120 may initiate the voice call continuity procedure to handover the voice bearer traffic to the target base station associated with a third RAN, initiate the voice call continuity procedure to handover the UE connected to the second RAN to the target base station associated with the third RAN based on the bypass handover message, and receive an indication of completion of the voice call continuity procedure from a second network device associated with the third RAN, where indication of completion of the voice call continuity procedure includes a handover response message.

Differentiation component 1125 may differentiate between voice bearer traffic and non-voice bearer traffic associated with the UE based on a QCI. In some examples, the differentiation component 1125 may determine voice bearer traffic based on a QCI value of 1.

Radio access network component 1130 may identify one or more RANs. In some cases, the first RAN is an E-UTRAN, the second RAN is NG RAN, and the third RAN is GERAN or UTRAN.

Network device component 1135 may identify one or more network device components. In some cases, the first network device is an MME associated with the E-UTRAN, the second network device is an MSC server associated with the GERAN or an MSC associated with the UTRAN, and the third network device is an AMF associated with the NG RAN. In some cases, the third network device associated with the second RAN does not have a backhaul connection link with the third RAN. In some cases, the first network device has a backhaul connection link with the third RAN.

Bypass handover message component 1140 may determine one or more information included in the bypass handover message. In some cases, the bypass handover message includes at least one identification associated with the target base station, a source to target transparent RRC container, an indication for the first network device to initiate the voice call continuity procedure to handover the UE, or a context associated with the UE.

SRVCC component 1145 may initiate an SRVCC procedure to handover a UE from a first RAN to a second RAN. In some cases, the voice call continuity procedure includes a SRVCC procedure.

Figure 12:
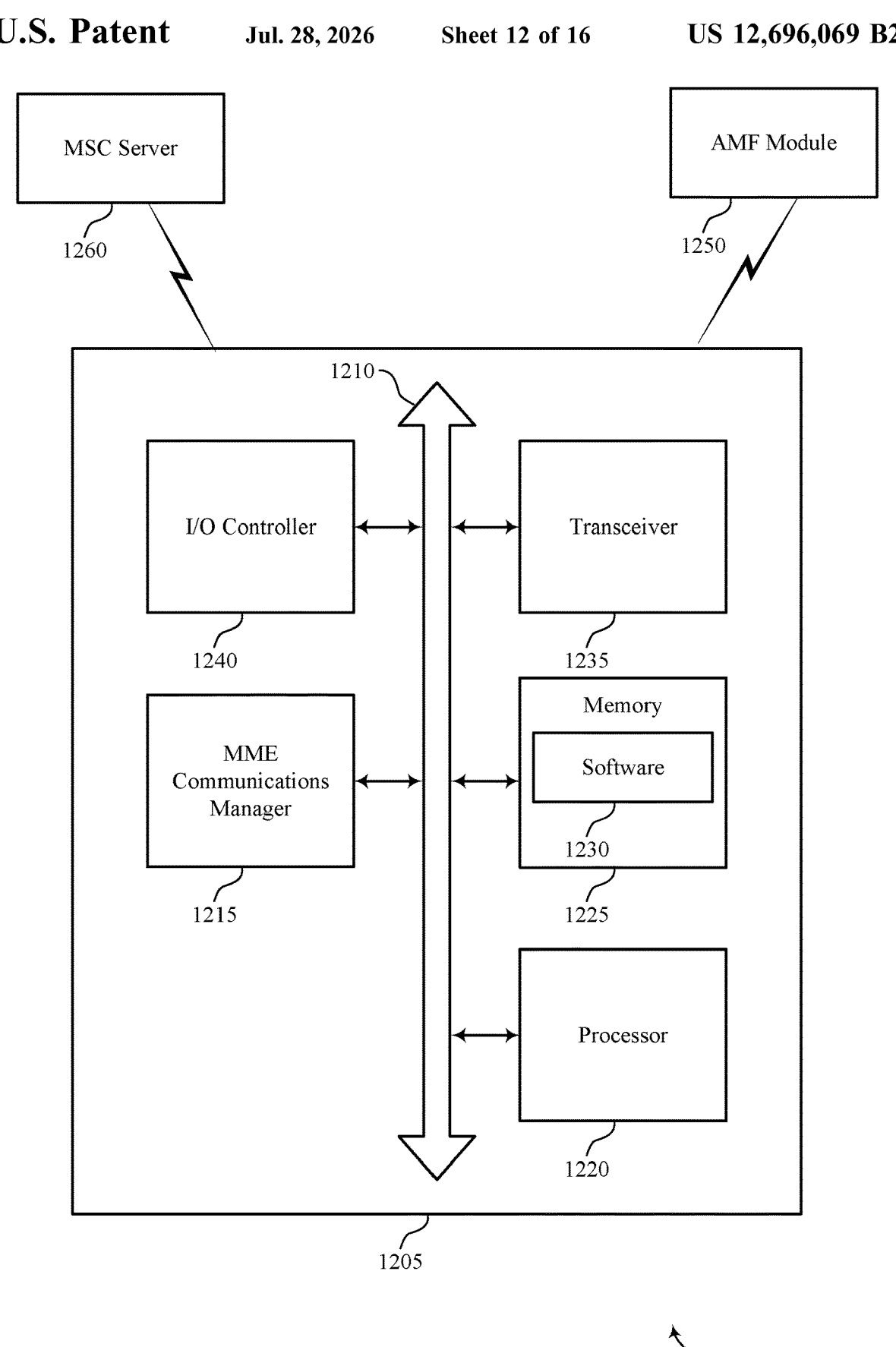
FIG. 12 illustrates a block diagram of a system including an MME that supports indirect SRVCC in accordance with aspects of the present disclosure.

FIG. 12 shows a diagram of a system 1200 including a device 1205 that supports indirect SRVCC in accordance with aspects of the present disclosure. Device 1205 may be an example of or include the components of MME 410 as described above, e.g., with reference to FIG. 4. Device 1205 may include components for bi-directional voice and data communications including components for transmitting and receiving communications, including MME communications manager 1215, processor 1220, memory 1225, software 1230, transceiver 1235, and I/O controller 1240. These components may be in electronic communication via one or more buses (e.g., bus 1210). In some cases, device 1205 may be communicatively coupled to AMF 1250 and MSC server 1260. In some implementations, the device 1205 may be associated with E-UTRAN, the AMF 1250 may be associated with NG RAN, and the MSC server 1260 may be associated with GERAN or UTRAN. For example, the device 1205 may be part of the core network of an LTE system, the AMF 1250 may be part of the core network of a 5G system, and the MSC server 1260 may be part of the core network of a 2G or 3G system.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting indirect SRVCC).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support indirect SRVCC. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

I/O controller 1240 may manage input and output signals for device 1205. I/O controller 1240 may also manage peripherals not integrated into device 1205. In some cases, I/O controller 1240 may represent a physical connection or port to an external peripheral. In some cases, I/O controller 1240 may utilize an operating system such as iOS®, ANDROID®, MS-DOS®, MS-WINDOWS®, OS/2®, UNIX®, LINUX®, or another known operating system. In other cases, I/O controller 1240 may represent or interact with a modem, a keyboard, a mouse, a touchscreen, or a similar device. In some cases, I/O controller 1240 may be implemented as part of a processor. In some cases, a user may interact with device 1205 via I/O controller 1240 or via hardware components controlled by I/O controller 1240.

Figure 13:
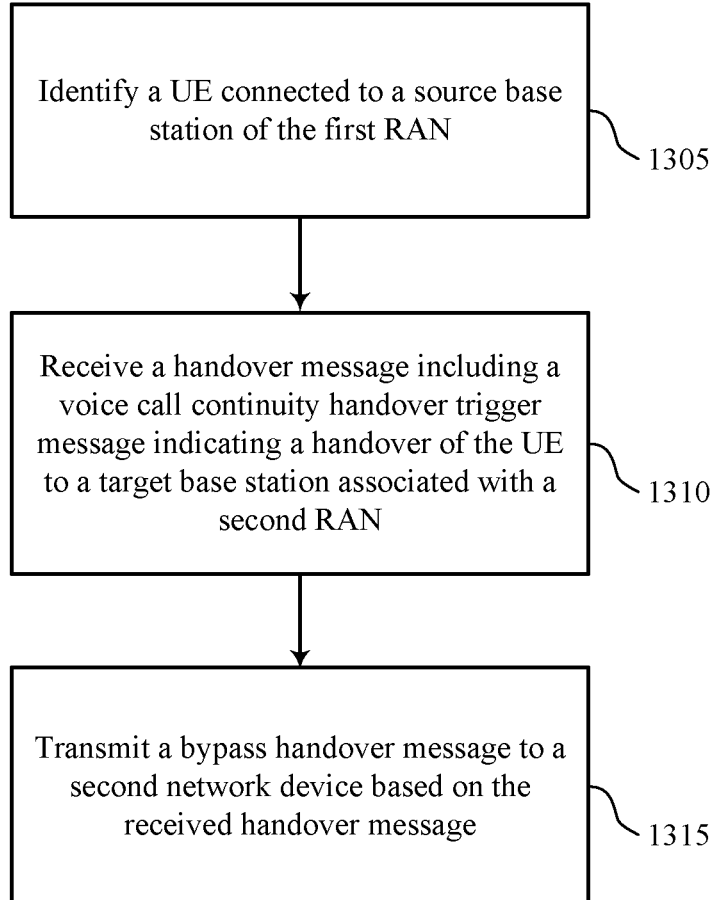

FIG. 13 shows a flowchart illustrating a method 1300 for indirect SRVCC in accordance with aspects of the present disclosure. The operations of method 1300 may be implemented by an AMF 402 or its components as described herein. For example, the operations of method 1300 may be performed by an AMF communications manager as described with reference to FIGS. 5 through 8. In some examples, an AMF 402 may execute a set of codes to control the functional elements of the device to perform the functions described below. Additionally or alternatively, the AMF 402 may perform aspects of the functions described below using special-purpose hardware.

At 1305 the AMF 402 may identify a UE connected to a source base station of the first RAN. The operations of 1305 may be performed according to the methods described herein. In certain examples, aspects of the operations of 1305 may be performed by a UE identification component as described with reference to FIGS. 5 through 8.

At 1310 the AMF 402 may receive a handover message including a voice call continuity handover trigger message indicating a handover of the UE to a target base station associated with a second RAN. The operations of 1310 may be performed according to the methods described herein. In certain examples, aspects of the operations of 1310 may be performed by a handover message component as described with reference to FIGS. 5 through 8.

At 1315 the AMF 402 may transmit a bypass handover message to a second network device based on the received handover message. In some cases, the bypass handover message may include the voice call continuity handover trigger message. The operations of 1315 may be performed according to the methods described herein. In certain examples, aspects of the operations of 1315 may be performed by a transmitter as described with reference to FIGS. 5 through 8.

Figure 14:
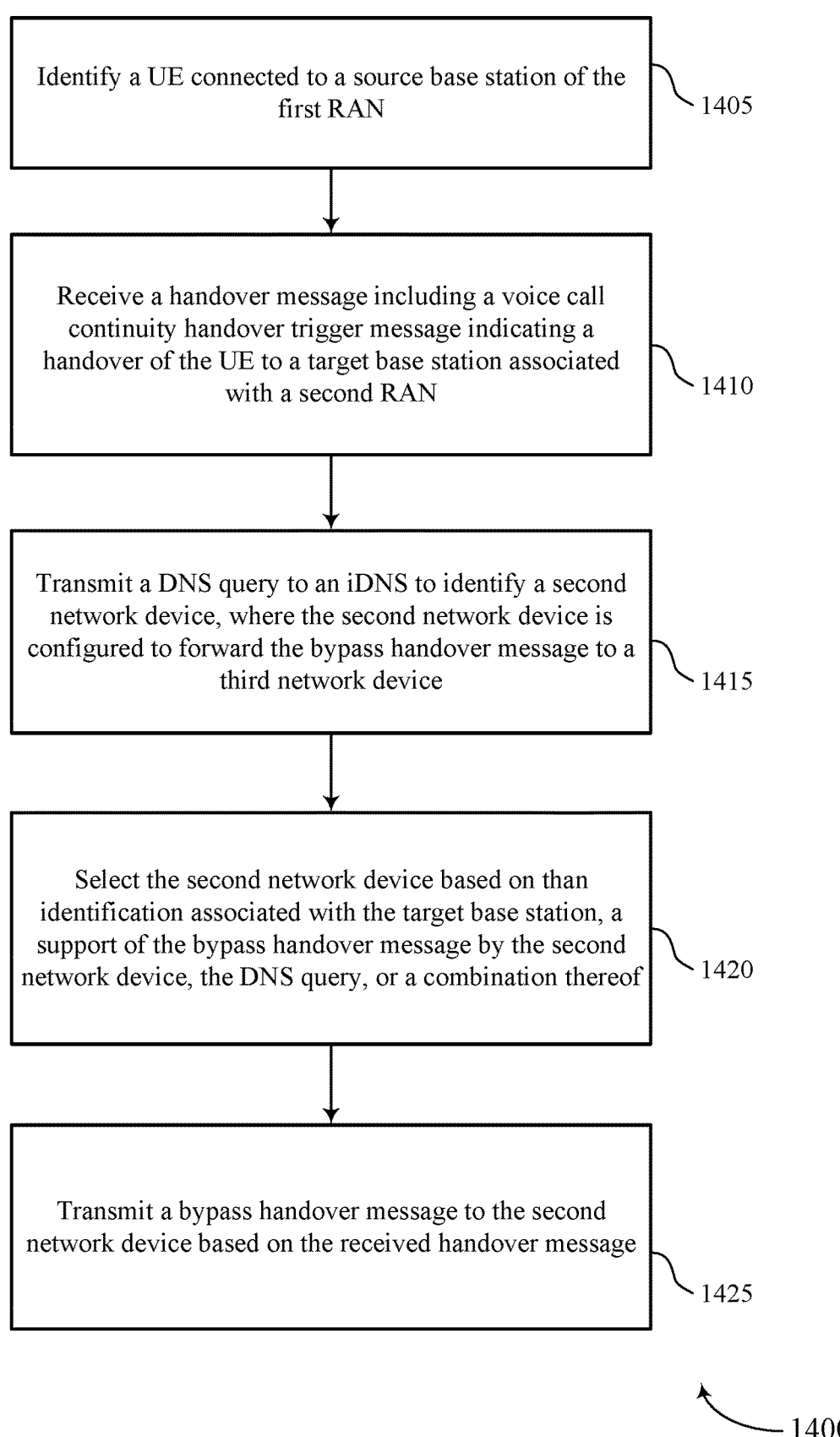

FIG. 14 shows a flowchart illustrating a method 1400 for indirect SRVCC in accordance with aspects of the present disclosure. The operations of method 1400 may be implemented by an AMF 402 or its components as described herein. For example, the operations of method 1400 may be performed by an AMF communications manager as described with reference to FIGS. 5 through 8. In some examples, an AMF 402 may execute a set of codes to control the functional elements of the device to perform the functions described below. Additionally or alternatively, the AMF 402 may perform aspects of the functions described below using special-purpose hardware.

At 1405 the AMF 402 may identify a UE connected to a source base station of the first RAN. The operations of 1405 may be performed according to the methods described herein. In certain examples, aspects of the operations of 1405 may be performed by a UE identification component as described with reference to FIGS. 5 through 8.

At 1410 the AMF 402 may receive a handover message including a voice call continuity handover trigger message indicating a handover of the UE to a target base station associated with a second RAN. The operations of 1410 may be performed according to the methods described herein. In certain examples, aspects of the operations of 1410 may be performed by a handover message component as described with reference to FIGS. 5 through 8.

At 1415 the AMF 402 may transmit a DNS query to an iDNS to identify the second network device. In some examples, the second network device is configured to forward the bypass handover message to a third network device, the third network device being associated with the second RAN and configured to serve the target base station. The operations of 1415 may be performed according to the methods described herein. In certain examples, aspects of the operations of 1415 may be performed by a network device component as described with reference to FIGS. 5 through 8.

At 1420 the AMF 402 may select the second network device based on an identification associated with the target base station, a support of the bypass handover message by the second network device, the DNS query, or a combination thereof. The operations of 1420 may be performed according to the methods described herein. In certain examples, aspects of the operations of 1420 may be performed by a network device component as described with reference to FIGS. 5 through 8.

At 1425 the AMF 402 may transmit a bypass handover message to a second network device based on the received handover message, the bypass handover message including the voice call continuity handover trigger message. The operations of 1425 may be performed according to the methods described herein. In certain examples, aspects of the operations of 1425 may be performed by a transmitter as described with reference to FIGS. 5 through 8.

FIG. 15 shows a flowchart illustrating a method 1500 for indirect SRVCC in accordance with aspects of the present disclosure. The operations of method 1500 may be implemented by an MME 410 or its components as described herein. For example, the operations of method 1500 may be performed by an MME communications manager as described with reference to FIGS. 9 through 12. In some examples, an MME 410 may execute a set of codes to control the functional elements of the device to perform the functions described below. Additionally or alternatively, the MME 410 may perform aspects of the functions described below using special-purpose hardware.

At 1505 the MME 410 may receive a bypass handover message including an indication to initiate a voice call continuity procedure to handover a UE connected to a second RAN to a target base station associated with a third RAN. In some cases, the MME 410 may be associated with a first RAN. The operations of 1505 may be performed according to the methods described herein. In certain examples, aspects of the operations of 1505 may be performed by a receiver as described with reference to FIGS. 9 through 12.

At 1510 the MME 410 may initiate the voice call continuity procedure to handover the UE connected to the second RAN to the target base station associated with the third RAN based at least in part on the bypass handover message. The operations of 1510 may be performed according to the methods described herein. In certain examples, aspects of the operations of 1510 may be performed by a voice call continuity component as described with reference to FIGS. 9 through 12.

At 1515 the MME 410 may receive an indication of completion of the voice call continuity procedure from a second network device associated with the third RAN. In some cases, indication of completion of the voice call continuity procedure includes a handover response message. The operations of 1515 may be performed according to the methods described herein. In certain examples, aspects of the operations of 1515 may be performed by a voice call continuity component as described with reference to FIGS. 9 through 12.

At 1520 the MME 410 may transmit the handover response message to a third network device associated with the second RAN. The operations of 1520 may be performed according to the methods described herein. In certain examples, aspects of the operations of 1520 may be performed by a transmitter as described with reference to FIGS. 9 through 12.

FIG. 16 shows a flowchart illustrating a method 1600 for indirect SRVCC in accordance with aspects of the present disclosure. The operations of method 1600 may be implemented by an MME 410 or its components as described herein. For example, the operations of method 1600 may be performed by an MME communications manager as described with reference to FIGS. 9 through 12. In some examples, an MME 410 may execute a set of codes to control the functional elements of the device to perform the functions described below. Additionally or alternatively, the MME 410 may perform aspects of the functions described below using special-purpose hardware.

At 1605 the MME 410 may receive, a bypass handover message including an indication to initiate a voice call continuity procedure to handover a UE connected to a second RAN to a target base station associated with a third RAN. In some cases, the MME 410 may be associated with a first RAN. The operations of 1605 may be performed according to the methods described herein. In certain examples, aspects of the operations of 1605 may be performed by a receiver as described with reference to FIGS. 9 through 12.

At 1610 the MME 410 may differentiate between voice bearer traffic and non-voice bearer traffic associated with the UE based at least in part on a QCI. For example, the MME 410 may determine voice bearer traffic associated with a QCI value of 1 and non-voice bearer traffic associated with other QCI values. The operations of 1610 may be performed according to the methods described herein. In certain examples, aspects of the operations of 1610 may be performed by a differentiation component as described with reference to FIGS. 9 through 12.

At 1615 the MME 410 may initiate the voice call continuity procedure to handover the voice bearer traffic to the target base station associated with a third RAN. The operations of 1615 may be performed according to the methods described herein. In certain examples, aspects of the operations of 1615 may be performed by a voice call continuity component as described with reference to FIGS. 9 through 12.

At 1620 the MME 410 may receive an indication of completion of the voice call continuity procedure from a second network device associated with the third RAN. In some cases, indication of completion of the voice call continuity procedure includes a handover response message. The operations of 1620 may be performed according to the methods described herein. In certain examples, aspects of the operations of 1620 may be performed by a voice call continuity component as described with reference to FIGS. 9 through 12.

At 1625 the MME 410 may transmit the handover response message to a third network device associated with the second RAN. The operations of 1625 may be performed according to the methods described herein. In certain examples, aspects of the operations of 1625 may be performed by a transmitter as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA.

A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the to provide an understanding of the described techniques. These techniques, however, may be practiced without these specific details. In some instances, well-known structures and devices are shown in block diagram form to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A first network device for wireless communication, comprising:

one or more processors; and one or more memories individually or collectively coupled with the one or more processors, the one or more processors configured to:

receive, by the first network device, a bypass handover message comprising an indication to initiate a voice call continuity procedure to handover a user equipment (UE) connected to a second radio access network (RAN) to a target network device associated with a third RAN;

initiate the voice call continuity procedure to handover the UE connected to the second RAN to the target network device associated with the third RAN based at least in part on the bypass handover message, wherein the voice call continuity procedure is based at least in part on a backhaul connection of the first network device with the target network device;

receive an indication of completion of the voice call continuity procedure from a second network device associated with the third RAN, wherein the indication of completion of the voice call continuity procedure comprises a handover response message; and transmit the handover response message to a third network device associated with the second RAN.

2. The first network device of claim 1, wherein the one or more processors are individually or collectively further configured to:

differentiate between voice bearer traffic and non-voice bearer traffic associated with the UE based at least in part on a Quality of Service Class Identifier (QCI); and initiate the voice call continuity procedure to handover the voice bearer traffic to the target network device associated with the third RAN.

3. The first network device of claim 1, wherein the second RAN is a Next Generation (NG) RAN, and the third RAN is a GSM/EDGE Radio Access Network (GERAN) or a Universal Terrestrial Radio Access Network (UTRAN).

4. The first network device of claim 3, wherein the first network device is associated with an Evolved Universal Terrestrial Radio Access Network (E-UTRAN).

5. The first network device of claim 4, wherein the first network device is a mobility management entity (MME) associated with the E-UTRAN, the second network device is a Mobile Switching Center (MSC) server associated with the GERAN or an MSC associated with the UTRAN, and the third network device is an access and mobility management function (AMF) associated with the NG RAN.

6. The first network device of claim 1, wherein the bypass handover message comprises at least one of: an identification associated with the target network device, a source to target transparent Radio Resource Control (RRC) container, an indication for the first network device to initiate the voice call continuity procedure to handover the UE, or a context associated with the UE.

7. The first network device of claim 1, wherein the third network device associated with the second RAN does not have a backhaul connection link with the third RAN.

8. The first network device of claim 7, wherein the first network device has the backhaul connection link with the third RAN.

9. The first network device of claim 1, wherein the voice call continuity procedure comprises a Single Radio Voice Call Continuity (SRVCC) procedure.

10. A method for wireless communication, comprising:

receiving, by a first network device, a bypass handover message comprising an indication to initiate a voice call continuity procedure to handover a user equipment (UE) connected to a second radio access network (RAN) to a target network device associated with a third RAN;

initiating the voice call continuity procedure to handover the UE connected to the second RAN to the target network device associated with the third RAN based at least in part on the bypass handover message, wherein the voice call continuity procedure is based at least in part on a backhaul connection of the first network device with the target network device;

receiving an indication of completion of the voice call continuity procedure from a second network device associated with the third RAN, wherein the indication of completion of the voice call continuity procedure comprises a handover response message; and transmitting the handover response message to a third network device associated with the second RAN.

11. The method of claim 10, wherein initiating the voice call continuity procedure further comprises:

differentiating between voice bearer traffic and non-voice bearer traffic associated with the UE based at least in part on a Quality of Service Class Identifier (QCI); and initiating the voice call continuity procedure to handover the voice bearer traffic to the target network device associated with the third RAN.

12. The method of claim 10, wherein the second RAN is a Next Generation (NG) RAN, and the third RAN is a GSM/EDGE Radio Access Network (GERAN) or a Universal Terrestrial Radio Access Network (UTRAN).

13. The method of claim 12, wherein the first network device is associated with an Evolved Universal Terrestrial Radio Access Network (E-UTRAN).

14. The method of claim 13, wherein the first network device is a mobility management entity (MME) associated with the E-UTRAN, the second network device is a Mobile Switching Center (MSC) server associated with the GERAN or an MSC associated with the UTRAN, and the third network device is an access and mobility management function (AMF) associated with the NG RAN.

15. The method of claim 10, wherein the bypass handover message comprises at least one of: an identification associated with the target network device, a source to target transparent Radio Resource Control (RRC) container, an indication for the first network device to initiate the voice call continuity procedure to handover the UE, or a context associated with the UE.

16. The method of claim 10, wherein the third network device associated with the second RAN does not have a backhaul connection link with the third RAN.

17. The method of claim 16, wherein the first network device has the backhaul connection link with the third RAN.

18. The method of claim 10, wherein the voice call continuity procedure comprises a Single Radio Voice Call Continuity (SRVCC) procedure.

19. A non-transitory computer-readable medium storing code for wireless communication, the code comprising instructions executable by one or more processors to:

receive, by a first network device, a bypass handover message comprising an indication to initiate a voice call continuity procedure to handover a user equipment (UE) connected to a second radio access network (RAN) to a target network device associated with a third RAN;

initiate the voice call continuity procedure to handover the UE connected to the second RAN to the target network device associated with the third RAN based at least in part on the bypass handover message, wherein the voice call continuity procedure is based at least in part on a backhaul connection of the first network device with the target network device;

receive an indication of completion of the voice call continuity procedure from a second network device associated with the third RAN, wherein the indication of completion of the voice call continuity procedure comprises a handover response message; and transmit the handover response message to a third network device associated with the second RAN.

20. The non-transitory computer-readable medium of claim 19, wherein the instructions are further executable by the one or more processors to:

differentiate between voice bearer traffic and non-voice bearer traffic associated with the UE based at least in part on a Quality of Service Class Identifier (QCI); and initiate the voice call continuity procedure to handover the voice bearer traffic to the target network device associated with the third RAN.

21. The non-transitory computer-readable medium of claim 19, wherein the second RAN is a Next Generation (NG) RAN, and the third RAN is a GSM/EDGE Radio Access Network (GERAN) or a Universal Terrestrial Radio Access Network (UTRAN).

22. The non-transitory computer-readable medium of claim 21, wherein the first network device is associated with an Evolved Universal Terrestrial Radio Access Network (E-UTRAN).

23. The non-transitory computer-readable medium of claim 22, wherein the first network device is a mobility management entity (MME) associated with the E-UTRAN, the second network device is a Mobile Switching Center (MSC) server associated with the GERAN or an MSC associated with the UTRAN, and the third network device is an access and mobility management function (AMF) associated with the NG RAN.

24. The non-transitory computer-readable medium of claim 19, wherein the bypass handover message comprises at least one of: an identification associated with the target network device, a source to target transparent Radio Resource Control (RRC) container, an indication for the first network device to initiate the voice call continuity procedure to handover the UE, or a context associated with the UE.

25. The non-transitory computer-readable medium of claim 19, wherein the third network device associated with the second RAN does not have a backhaul connection link with the third RAN.

26. The non-transitory computer-readable medium of claim 25, wherein the first network device has the backhaul connection link with the third RAN.

27. The non-transitory computer-readable medium of claim 19, wherein the voice call continuity procedure comprises a Single Radio Voice Call Continuity (SRVCC) procedure.

28. A first network device for wireless communication, comprising:

means for receiving, by the first network device, a bypass handover message comprising an indication to initiate a voice call continuity procedure to handover a user equipment (UE) connected to a second radio access network (RAN) to a target network device associated with a third RAN;

means for initiating the voice call continuity procedure to handover the UE connected to the second RAN to the target network device associated with the third RAN based at least in part on the bypass handover message, wherein the voice call continuity procedure is based at least in part on a backhaul connection of the first network device with the target network device;

means for receiving an indication of completion of the voice call continuity procedure from a second network device associated with the third RAN, wherein the indication of completion of the voice call continuity procedure comprises a handover response message; and means for transmitting the handover response message to a third network device associated with the second RAN.

29. The first network device of claim 28, wherein the means for initiating the voice call continuity procedure further comprise:

means for differentiating between voice bearer traffic and non-voice bearer traffic associated with the UE based at least in part on a Quality of Service Class Identifier (QCI); and means for initiating the voice call continuity procedure to handover the voice bearer traffic to the target network device associated with the third RAN.

30. The first network device of claim 28, wherein the second RAN is a Next Generation (NG) RAN, and the third RAN is a GSM/EDGE Radio Access Network (GERAN) or a Universal Terrestrial Radio Access Network (UTRAN).

* * * * *